United States Patent
Desai et al.

(10) Patent No.: US 10,198,143 B2
(45) Date of Patent: Feb. 5, 2019

(54) PROVIDING USER INTERFACES AND WINDOW PREVIEWS FOR HOSTED APPLICATIONS

(71) Applicant: Citrix Systems, Inc., Fort Lauderdale, FL (US)

(72) Inventors: Nitin Desai, Coral Springs, FL (US); Georgy Momchilov, Coconut Creek, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 415 days.

(21) Appl. No.: 14/211,966

(22) Filed: Mar. 14, 2014

(65) Prior Publication Data

US 2014/0201679 A1    Jul. 17, 2014

Related U.S. Application Data

(63) Continuation of application No. 13/252,557, filed on Oct. 4, 2011, now Pat. No. 8,713,474.

(60) Provisional application No. 61/389,767, filed on Oct. 5, 2010.

(51) Int. Cl.
*G06F 3/048* (2013.01)
*G06F 3/0481* (2013.01)
*G06F 9/451* (2018.01)

(52) U.S. Cl.
CPC ............ *G06F 3/0481* (2013.01); *G06F 9/452* (2018.02)

(58) Field of Classification Search
CPC ................ G06F 3/0481; G06F 9/4445; G09G 2340/0407
See application file for complete search history.

(56) References Cited

U.S. PATENT DOCUMENTS

| 7,681,143 B2 | 3/2010 | Lindsay et al. |
| 8,453,069 B2 * | 5/2013 | Kanda .................. G06F 3/0481 455/411 |
| 2005/0283734 A1 | 12/2005 | Santoro et al. |
| 2006/0230156 A1 | 10/2006 | Shappir et al. |
| 2007/0113190 A1 | 5/2007 | Clark et al. |
| 2008/0104520 A1 | 5/2008 | Swenson et al. |
| 2008/0115081 A1 | 5/2008 | Sankaravadivelu et al. |
| 2009/0070687 A1 * | 3/2009 | Mazzaferri ............ G06F 9/542 715/751 |
| 2009/0094523 A1 * | 4/2009 | Treder .................... G06F 9/542 715/738 |

(Continued)

FOREIGN PATENT DOCUMENTS

WO    WO 2008041297 A1 *    4/2008    .......... G06F 3/0481

*Primary Examiner* — Rashawn N Tillery
(74) *Attorney, Agent, or Firm* — Banner & Witcoff, Ltd.

(57) ABSTRACT

A local computing device may use a remote computing device to host various resources on behalf of the local computing device. The local computing device may receive data related to a graphical window of the remotely hosted resource and generate a graphical window on the local desktop environment for the remotely hosted resource. The local computing device may also update a taskbar to include the remote hosted resource. Window previews may also be generated by the local computing device and the window previews may include snapshots or dynamic images of the graphical window for the remotely hosted resource. In some instances, the snapshots may be provided to the local computing device from the remote computing device.

20 Claims, 22 Drawing Sheets

(56) References Cited

U.S. PATENT DOCUMENTS

| | | | |
|---|---|---|---|
| 2009/0193364 A1* | 7/2009 | Jarrett | G06F 3/04817 |
| | | | 715/838 |
| 2010/0185587 A1* | 7/2010 | Lovinger | G06F 17/30079 |
| | | | 707/660 |
| 2011/0113346 A1 | 5/2011 | O'Shaugnessy et al. | |
| 2011/0138295 A1 | 6/2011 | Momchilov et al. | |
| 2011/0138314 A1 | 6/2011 | Mir et al. | |
| 2011/0225542 A1* | 9/2011 | Schmieder | G06F 3/0481 |
| | | | 715/794 |

* cited by examiner

PROVIDING USER INTERFACES AND WINDOW PREVIEWS FOR HOSTED APPLICATIONS

CROSS REFERENCE TO RELATED APPLICATIONS

This application is a continuation of and claims priority to U.S. patent application Ser. No. 13/252,557, filed Oct. 4, 2011, and entitled "PROVIDING USER INTERFACES AND WINDOW PREVIEWS FOR HOSTED APPLICATIONS," which claims priority to U.S. Provisional Patent Application Ser. No. 61/389,767, filed Oct. 5, 2010, and entitled "METHODS AND SYSTEMS FOR PROVIDING SEAMLESS THUMBNAILS FOR HOSTED APPLICATIONS," the disclosures of each of which are incorporated by reference herein in their entirety.

TECHNICAL FIELD

The present disclosure relates to user interfaces for hosted applications. The present disclosure also relates to methods and systems for integrating remotely hosted applications into the desktop environment of a local computing device. Additionally, the present disclosure relates to methods and systems for providing, on a local machine, seamless thumbnails of graphical data that is generated on a remote machine.

BACKGROUND

Operating systems, such as the Windows operating system of Microsoft Corp. and the Macintosh Operating System (Mac OS) of Apple Inc., provide graphical user interfaces to users that allow a user to interact with a process or application. Some applications may be hosted remotely. For example, a user may connect a local computer to a remote computing device. While connected, the user may interact with a local version of the desktop environment of the remote computing device, such as by launching remote applications hosted by the remote computing device and interacting with the remote applications (e.g., launching a document editor and editing/creating documents). Communication between the remote computing device and the local computer may enable the local computer to graphically display the applications and the desktop environment of the remote computing device. However, there may be resources that the user executes on the local computing device (e.g., locally hosted applications, such as a document editor hosted by the local computer). A user may find navigating between multiple graphical displays confusing or difficult to use productively. A user may also wish to use data generated by one application with an application hosted by a different computer.

Some operating systems may provide user interfaces based around static or dynamic thumbnails. For example, various versions of the Windows operating system of Microsoft Corp. include the Windows Flip and Flip 3D interfaces, which present a comprehensive view of open windows by presenting rendered static or dynamic thumbnails of those windows, allowing a user to intuitively select a window to make active. Some versions of the Windows operating system also include Windows Taskbar Preview, which displays a thumbnail preview of a window when a user moves a mouse cursor over a taskbar icon; and Windows Peek, which, when a user moves a mouse over a taskbar thumbnail or icon, turns all windows except the window associated with the thumbnail or icon transparent, allowing the user to view the window even if it's in the background. Similarly, the Mac OS operating system of Apple Inc. includes the Expose interface, which displays live thumbnails of open windows.

In order to provide these user interfaces, many operating systems may require access to the graphics content of each window individually. However, many systems using thin-client computing or remote display presentation protocols for display of applications executing on a remote machine may flatten images of overlapping windows into a single image. For example, these systems may use a 2D logical video buffer (LVB) with no window awareness built into the graphics protocol. This can result in unwanted effects in which a thumbnail created on a local machine of a remotely generated window includes an overlapping section of a second remotely generated window.

Thus, there remains an ever-present need to provide more useful user interfaces of remotely hosted applications to provide a more user-friendly and productive experience to users of the remotely hosted applications.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

In some embodiments herein, a local computing device and a remote computing device may communicate data related to a resource being hosted by the remote computing device on behalf of the local computing device. The local computing device may generate a graphical window corresponding to the remotely hosted resource in its desktop environment. The local computing device may also update a taskbar of its desktop environment so that the window may be accessed via the taskbar. For example, updating the taskbar may include creating a taskbar group for display on the taskbar and inserting an icon into a taskbar group. Some desktop environments have various elements that display window previews of windows existing in the desktop environment. The local computing device may provide a snapshot of a graphical window for the remotely hosted resource as part of the window preview.

In some embodiments, the local computing device may request the snapshots from the remote computing device. For example, a snapshot may be requested in order to be used in various window previews such as Windows Flip, Flip 3D, Taskbar Preview, Peek, Mac OS Expose, and the like. Responsive to receiving a request, the remote computing device may take the snapshot from its desktop environment and transmit the snapshot to the local computing device. Upon receiving the snapshot that was created by the remote computing device, the local computing device may display received snapshot as part of a window preview, such as a thumbnail preview of the remotely hosted resource's graphical window. In some instances, the snapshot is used instead of a graphical representation that is created by the local computing device.

The details of these and other embodiments of the present disclosure are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Some embodiments may be described in the context of a network providing services to user devices over various networks using one or more protocols. The disclosure is not limited to any particular type of network or networks using a specific type of communication medium or to a specific set of communication protocols.

Figure 1:
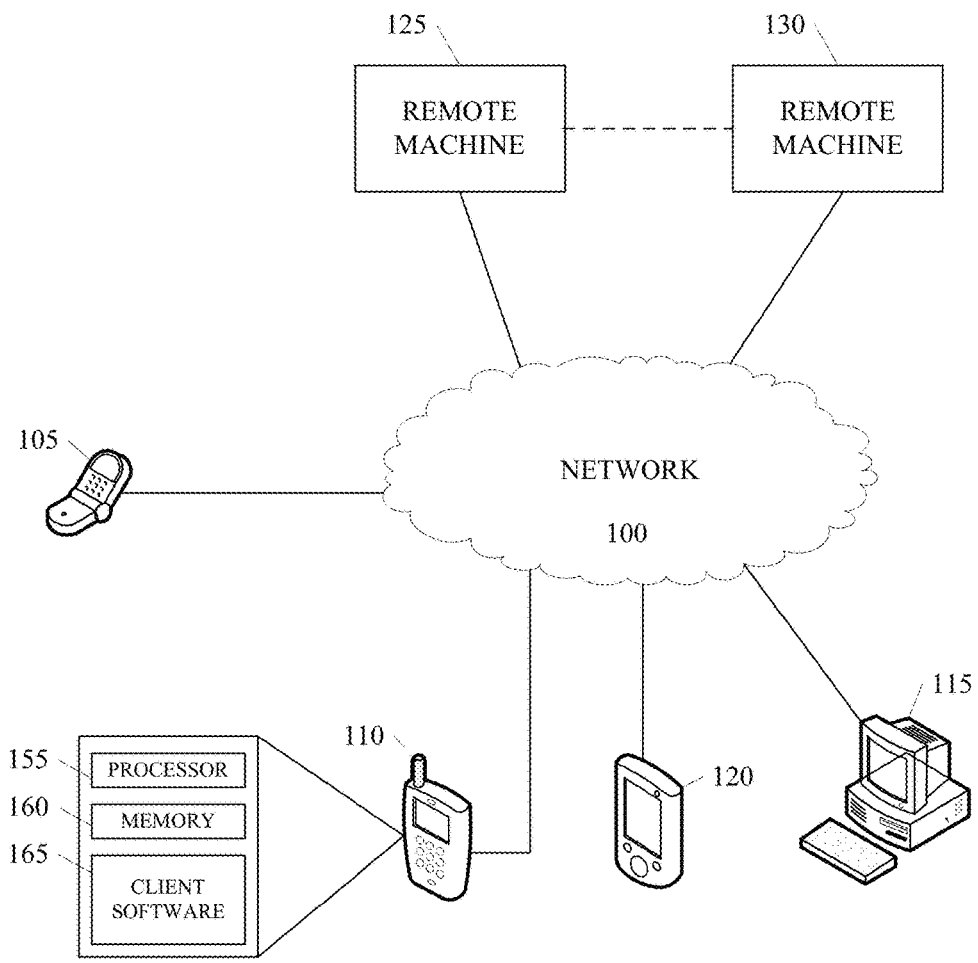
FIG. 1 is a block diagram showing an illustrative example of a network environment in which various aspects of this disclosure may be implemented.

FIG. 1 is a block diagram showing an illustrative example of a network environment in which various aspects of this disclosure may be implemented. In the embodiment illustrated in FIG. 1, the network environment may include a number of local computers and electronic devices (also generally referred to as local computing device(s), local machine(s), client computer(s), or the like), including mobile communication device 105, mobile phone 110, personal digital assistant (PDA) or mobile computer 120, personal computer (PC) 115 (e.g., laptop computer or desktop computer). Other types of local computing devices include a smart phone, a digital audio player, a portable media player, or some device that combines one or more of the above local computing devices (e.g., a device with functionality of a mobile phone and digital audio player). The network environment may also include one or more remote computing devices (also generally referred to as server(s), remote server(s), or the like), such as remote machine 125 and remote machine 130. The various devices of the network environment may communicate with one another and with other devices through network 100. Network 100 may include wired and wireless connections and network elements, and connections over the network may include permanent or temporary connections. Communication through network 100 is not limited to the illustrated devices and may include additional mobile or fixed computing devices.

Although shown as a single network in FIG. 1 for simplicity, network 100 may include multiple networks that are interlinked so as to provide internetworked communications. Such networks may include one or more private or public packet-switched networks such as, for example, a local-area network (LAN) (e.g., a company intranet), a metropolitan area network (MAN), or a wide area network (WAN) (e.g., the Internet or World Wide Web). Such networks may also include one or more private or public circuit-switched networks (e.g., a public switched telephone network), a cellular network configured to facilitate communications to and from mobile communication device 105 and/or 110 (e.g., through use of base stations, mobile switching centers, etc.), a short or medium range wireless communication connection (e.g., Bluetooth®, ultra wideband (UWB), infrared, WiBree, wireless local area network (WLAN) according to one or more versions of Institute of Electrical and Electronics Engineers (IEEE) standard no. 802.11), or a high-speed wireless data network (e.g., Evolution-Data Optimized (EV-DO) networks, Universal Mobile Telecommunications System (UMTS) networks, Long Term Evolution (LTE) networks or Enhanced Data rates for GSM Evolution (EDGE) networks). Devices 105-120 may use various communication protocols such as Internet Protocol (IP), Transmission Control Protocol (TCP), Simple Mail Transfer Protocol (SMTP) among others known in the art.

Devices 105-120 may be configured to interact with each other or other devices, such as remote machine 125 and remote machine 130. In one example, mobile device 110 may include client software 165 that is configured to coordinate the transmission and reception of information to and from remote machine 130. In one arrangement, client software 165 may include application or server specific protocols for maintaining connections to and requesting/receiving data from remote machines 125 and/or 130. For example, client software 165 may comprise a Web browser or mobile variants thereof and content provider/server 130 may comprise a web server. Client software 165 may be stored in computer-readable memory 160 such as read only, random access memory, writeable and rewriteable media and removable media in device 110 and may include instructions that cause one or more components—for example, processor 155, a transceiver, and a display—of device 110 to perform various functions and methods including those described herein.

In some embodiments, the network environment 100 may include multiple, logically-grouped remote computing devices. In one of these embodiments, the logical group of remote machines may be referred to as a server farm. In another embodiment, the remote computing devices may be geographically dispersed (e.g., physically located in different geographic regions, countries, states, etc.). In some variations, a server farm may be administered as a single entity.

Each of the remote computing devices may be a file server, application server, web server, proxy server, gateway, application gateway, gateway server, or the like. Additionally, remote computing devices may be one or more blade servers or virtual machines. In some embodiments, remote machines 125 and 130 may provide a remote authentication dial-in user service, such as RADIUS. In one or more variations, the remote computing devices may have the capacity to function as either an application server or as a master application server.

In some embodiments, remote machine 125 and remote machine 130 may provide local computing devices (e.g., device 105, 110, 120 and 115) access to a computing environment. A computing environment may comprise an application, a plurality of applications, a desktop, a desktop environment, and/or a desktop session in which one or more applications may execute. In some instances, remote machine 125 or 130 may execute an application on behalf of a user of a local computing device. Remote machine 125 or 130 may execute a virtual machine, which provides an execution session within which applications execute on behalf of a user of a local computing device. Communication between the remote computing devices and local computing devices may be performed so that local computing devices may request execution of various applications hosted by the remote computing devices and/or that local computing devices may receive data related to the application for display on the local computing devices.

As used herein, a desktop, desktop environment, or desktop session refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

In some embodiments, each of the remote computing devices may be running one or more applications, such as an application providing a thin-client computing or remote display presentation application. In one embodiment, the remote computing devices may be executing as an application any portion of the Citrix Access Suite by Citrix Systems, Inc., such as the Metaframe or Citrix Presentation Server products; any of the Microsoft Windows Terminal Services manufactured by the Microsoft Corporation; and/or any of the following products manufactured by Citrix Systems, Inc.: Citrix XenApp, Citrix XenDesktop, Citrix Access Gateway. Various other suitable applications can also be executed, including an Independent Computing Architecture (ICA) client, developed by Citrix Systems, Inc.; an application providing email services such as Microsoft Exchange manufactured by the Microsoft Corporation; a web or Internet server application; a desktop sharing server application; and a collaboration server application. Additionally or alternatively, the remote computing devices may provide various types of hosted services or products, such as GoToMeeting provided by Citrix Online Division, Inc.; WebEx provided by WebEx, Inc.; and Microsoft Office Live Meeting provided by Microsoft Corporation.

Each of the local computing devices may execute, operate or otherwise provide one or more applications to facilitate remote computing. Such applications can be of various type and/or form such as a web browser, web-based client, client-server application, a thin-client computing client, ActiveX control, Java applet, or the like. Using such applications, a local computing device may be able to provide remotely hosted applications on the local computing devices. In some arrangements, the remotely hosted applications may be a server-based or a remote-based application executed on behalf of the local computing device on a remote computing device (e.g., remote machine 125). In one or more embodiments, a remote computing device may communicate data for display to the local computing device using any thin-client protocol, presentation layer protocol, or remote-display protocol, such as the ICA protocol; the Remote Desktop Protocol (RDP); the X11 protocol; the Virtual Network Computing (VNC) protocol; the SPICE protocol; the Net2Display protocol; the PC-over-IP protocol; the TCX protocol; the THINC protocol; and the Virtual-D protocols. Applications provided by the local computing device may use any type of protocol and one or more of the applications provided by the local computing device can be, for example, an HTTP client, an FTP client, an Oscar client, a Telnet client, software related to voice over Internet protocol (VoIP) communications; and applications related to real-time data communications (e.g., software for streaming video and/or audio).

In some embodiments, the remote computing devices and local computing devices may be configured to communicate with each other via any type or form of gateway or tunneling protocol, such as Secure Socket Layer (SSL), Transport Layer Security (TLS), and Citrix Gateway Protocol of Citrix Systems.

Figure 2A:
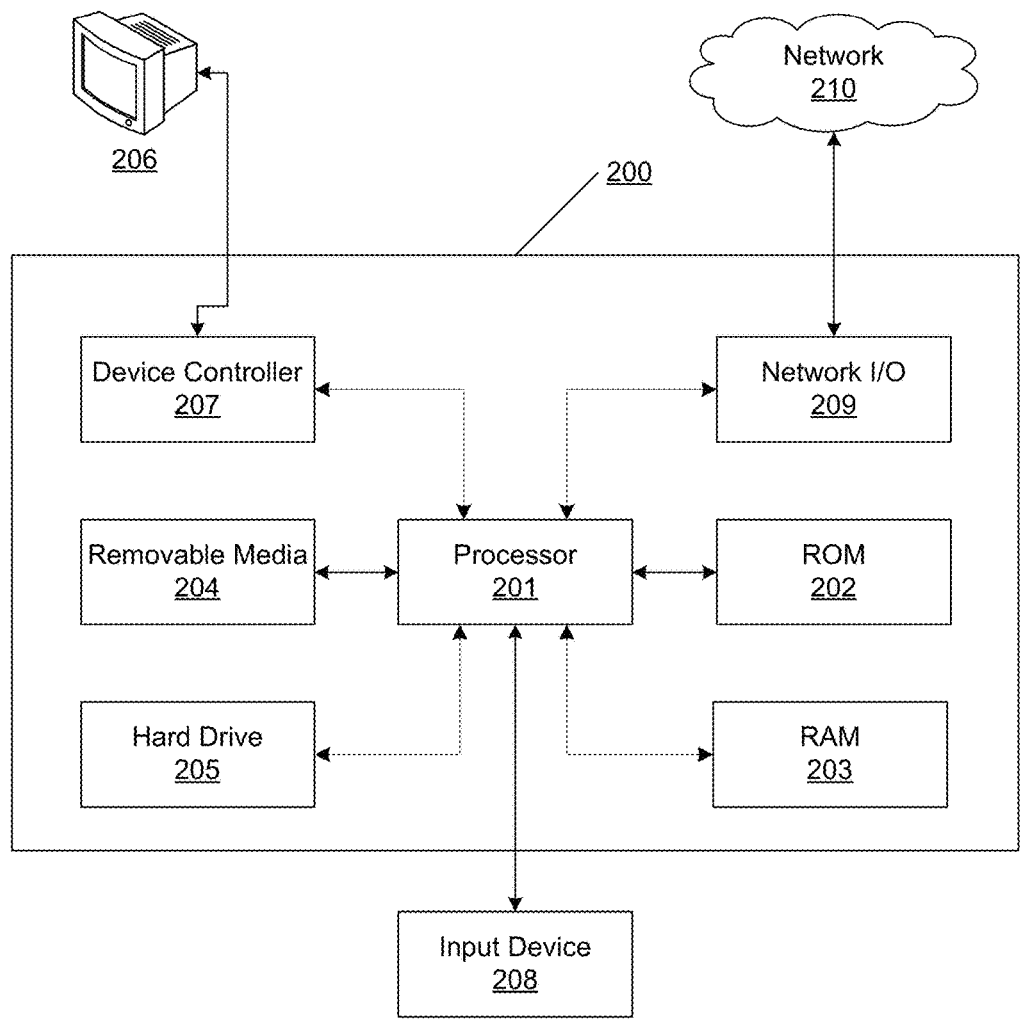
FIG. 2A illustrates an example hardware platform on which various elements described herein can be implemented.

FIG. 2A illustrates an example hardware platform on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions, one or more operating systems, and/or one or more applications may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines of a network illustrated in FIG. 1, or any other desired network.

The FIG. 2A example is an illustrative hardware configuration. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

Figure 2B:
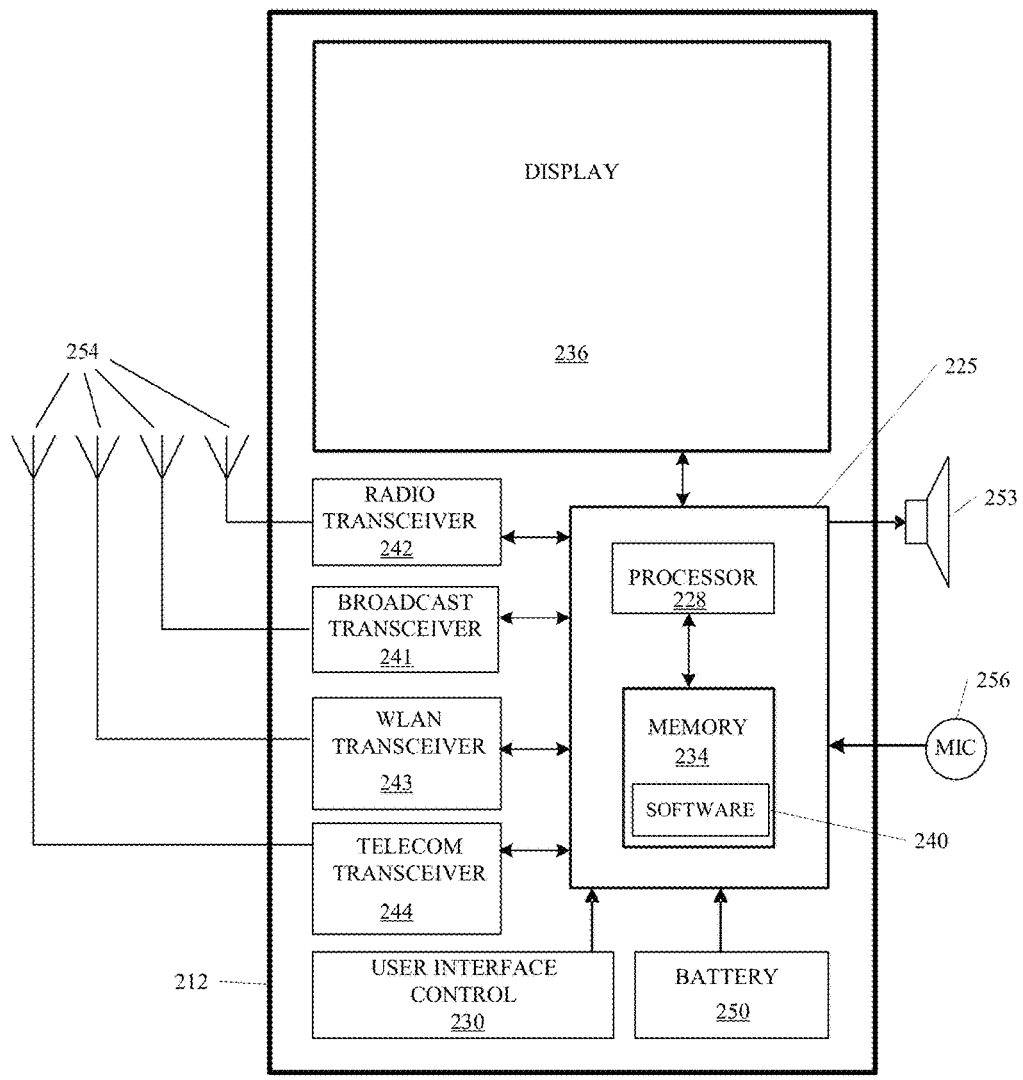
FIG. 2B illustrates an example mobile computing device that may be used in a network environment according to various aspects described herein.

FIG. 2B illustrates an example mobile computing device that may be used in a network environment, such as the network environment of FIG. 1. Mobile device 212 may include a controller 225 connected to a user interface control 230, display 236 and other elements as illustrated. Controller 225 may include one or more processors 228 and memory 234 storing software 240, such as an operating system and/or one or more applications. Mobile device 212 may also include a battery 250, speaker 253 and antenna 254. The mobile device 212 may include user interface circuitry, such as user interface control 230. User interface control 230 may include controllers or adapters, and other circuitry, configured to receive input from or provide output to a keypad, touch screen, voice interface. Input can be received, for example, via microphone 256, function keys, joystick, mouse and the like. The user interface circuitry, user interface software and operating system may be configured to facilitate user control of at least some functions of the mobile phone though use of a display. Display 236 may be configured to display at least a portion of a user interface of the mobile device. Additionally, the display may be configured to facilitate user control of at least some functions of the mobile device.

Mobile device 212 or its various components may be configured to receive, decode and process various types of transmissions including digital broadband broadcast transmissions that are based, for example, on the Digital Video Broadcast (DVB) standard, such as DVB-NGH, DVB-H, DVB-T2, DVB-H+ (hybrid satellite/terrestrial architecture), or Digital Video Broadcasting—Multimedia Home Platform (DVB-MHP), through a specific broadcast transceiver 241. Other digital transmission formats may alternatively be used to deliver content and information regarding availability of supplemental services. Additionally or alternatively, mobile device 212 may be configured to receive, decode and process transmissions through various transceivers, such as FM/AM Radio transceiver 242, wireless local area network (WLAN) transceiver 243, and telecommunications transceiver 244.

Although the above description of FIG. 2B generally relates to a mobile device (e.g., mobile devices 105, 110 of FIG. 1), other devices or systems may include the same or similar components and perform the same or similar functions and methods. For example, a stationary computer (e.g., personal computer 115 of FIG. 1A) may include the components or a subset of the components described above and may be configured to perform the same or similar functions as mobile device 212 and its components.

Computing devices, such as the examples depicted in FIGS. 2A and 2B, typically operate under the control of one or more operating systems. Operating systems may control scheduling of tasks and access to system resources. Various operating systems are suitable to operate a computing device, such as any of the versions of the Microsoft Windows operating systems, the different releases of the Unix and Linux operating systems, and any version of the MAC OS for Macintosh computers. Other types of operating systems include embedded operating systems, real-time operating systems, open source operating systems, proprietary operating systems, operating systems for mobile computing devices, and the like. Typical operating systems include, but are not limited to: Windows 3.x, Windows 95, Windows 98, Windows 2000, Windows NT 3.51, Windows NT 4.0, Windows 7, Windows CE, Windows XP, and Windows Vista, all of which are manufactured by Microsoft Corporation; Mac OS, manufactured by Apple Inc.; OS/2, manufactured by International Business Machines; and Linux, a freely-available operating system distributed by Caldera Corp.

Various application programming interfaces (API) and/or graphics subsystems may be used when interfacing with graphics being displayed by a computing device. Example APIs or graphic subsystems include Graphics Device Interface (GDI), the Open Graphics Library (OpenGL), DirectX, and the Windows Presentation Foundation (WPF). Some APIs allow applications to render graphics to a memory buffer, and another manager (e.g., a compositing manager such as Microsoft Windows Desktop Window Manager (DWM)) may then composite each application's buffer into a final image for display on the computing system.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more aspects, and such data structures are contemplated within the scope of computer executable instructions and computer-usable data described herein.

Figure 3:
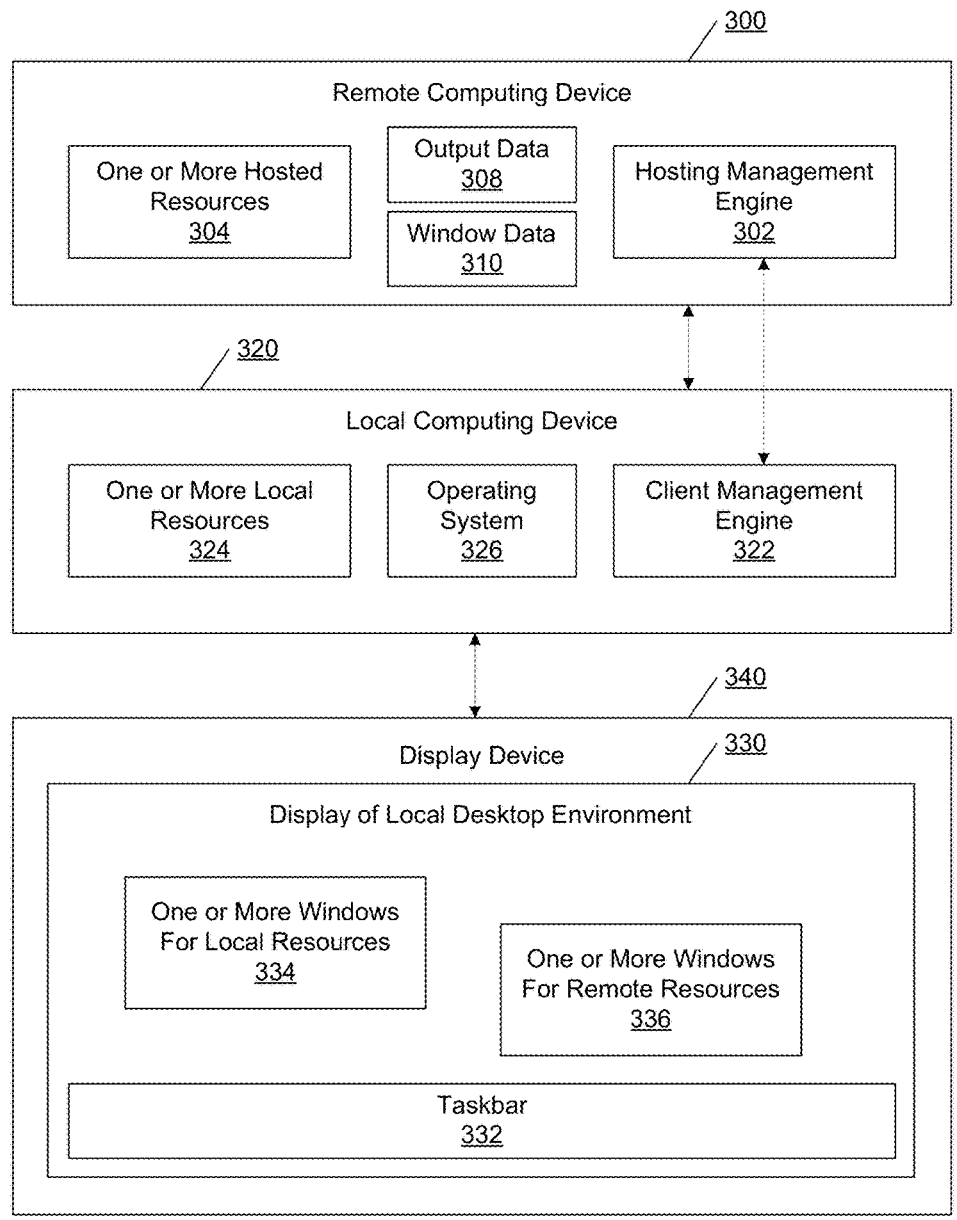
FIG. 3 is a block diagram showing an example arrangement for providing resources from a remote computing device to a local computing device according to various aspects described herein.

One or more aspects of this disclosure relate to providing resources from a remote computing device to a local computing device. A resource may be a program, application, document, file, graphical window, or the like. In some variations the resource (also referred to herein as a remote resource or hosted resource) may be operating in a desktop environment of the remote computing device. In one or more embodiments, a user may initiate a connection between a local computing device and a remote computing device. While connected, the user may interact with the remote computing device to request various actions for processing by the remote computing device, including, for example, execution of a resource, window moves, window minimize/maximize, window resizing, termination of a resource, editing of a resource, and saving of a resource. FIG. 3 is a block diagram showing an example arrangement for providing resources from a remote computing device to a local computing device. As illustrated in FIG. 3, remote computing device 300 may be in communication with a local computing device 320. Local computing device 320 may provide a display of a local desktop environment 330 or other graphical user interface, on display device 340, for viewing by a user. Additionally, local computing device 320 may be executing or otherwise providing one or more local resources 324.

In some embodiments, remote computing device 300 may be executing a hosting management engine 302. The hosting management engine 302 may be configured to receive data from the local computing device 320, including requests for resources, interactions with the resources, among other various data communications. In some variations, the hosting management engine 302 may be configured to send data to the local computing device 320, including data related to one or more hosted resources 304 being executed by the remote computing device 300. Additionally, the hosting management engine 302 may be configured to communicate with applications executing on the remote computing device 300 (e.g., hosted resources 304) and/or access data related to such applications (e.g., output data 308, window data 310). Further, the hosting management engine 302 may use a presentation layer protocol (layer 6 of the OSI model) for at least some communications.

While the one or more hosted resources 304 are executing, each may generate output data 308 and window data 310. Output data 308 and window data 310 may include the data used to prepare, render or include in a graphical window for a hosted resource, including, for example, window attributes defining properties of the graphical window (e.g., window size), data objects defining graphical elements that are displayed in the graphical window, data defining the window's relationship to another resource (e.g., an indication whether the window is a child of another window or application), object location data identifying locations for the graphical elements, data defining title bar contents for the graphical window, data describing the visual state of the graphical window (e.g., transparency), an icon (or bitmap of an icon) for the graphical window, window location data identifying the location for the graphical window in a desktop environment, a window preview image (described in more detail below, and also referred to as a thumbnail image) of the graphical window for a hosted resource, various identifiers for the resource (e.g., an application identifier, which is described in more detail below), and a path to the resource or the process that generated the resource. In some embodiments, the one or more hosted resources 304 may be executing within a desktop environment of the remote computing device 300. Additionally, in some variations, output and window data 308 may also include one or more commands, such as commands to create a window, delete a window, move a window, bring focus to a window, make a window transparent or partially transparent, open a menu of the window, close a menu of the window, resize a window, select a button or other element included in the window, etc.

Portions of output data 308 and window data 310 may be communicated to the local computing device 102 to enable the local computing device 320 to render a local version of a graphical window for the one or more hosted resources in local desktop environment 330, or otherwise graphically integrate the hosted resource into the local desktop environment 330. In some arrangements, hosting management engine 302 may be configured to directly communicate output data 308 and window data 310 to the client management engine 322 (e.g., via a port, channel or tunnel). Alternatively, hosting management engine 302 may be configured to cause or initiate communication of the output data 308 and window data 310 to the local computing device 320.

Client management engine 322 may receive data from the remote computing device 300, including output data 308 and window data 310. In some arrangements, the data may be received via dedicated ports, channels or tunnels. For example, client management engine 322 may receive output data 308 in one port, channel or tunnel, and may receive window preview or thumbnail images of a graphical window for the hosted application in another port, channel or tunnel.

Client management engine 322 may be configured to interface with operating system 326 of the local computing device to render a local version of the hosted resource. For example, client management engine 322 may interact with a shell of the operating system (e.g., Windows Explorer for the Windows operating system), which provides access to the configuration of local desktop environment 330. The client management engine 322 may be configured to communicate with the operating system 326 to modify the configuration and/or display of the operating system's desktop environment. For example, client management engine 322 may be configured to store output data and window data received from remote computing device 300 and may call one or more functions from a shared library, such as a dynamically-linked library (DLL) to maintain or modify the desktop environment (e.g., modify a taskbar, modify a placement of a window, close a window, create a window, modify contents of a window). Through the interactions with the operating system, the client management engine 322 may provide a local version of a hosted resource, which is executed by remote computing device 300, to a user of the local computing device.

The client management engine 322 may be configured to modify various elements of the operating system's desktop environment. For example, as shown by item 330 of FIG. 3, the local desktop environment may be displayed as a graphical interface on display 340. The display of the local desktop environment 330 may include various components such as, for example, a taskbar 332, one or more windows for local resources 334, and one or more windows for remote resources 336. In one or more embodiments, the client management engine 322 may be configured to modify taskbar 332, the windows for local resources 334, and/or the windows for remote resources 336. The methods used to modify the elements of the local desktop environment may depend on the operating system 326 operating on the local computing device 320. For example, a method for changing a taskbar in Microsoft Windows may be different than a method for changing a taskbar in Mac OS.

Additionally, in some variations, a local computing device may also be a host (e.g., operate an engine similar to a hosting management engine) and, for example, may provide remote display of one or more windows to another client device (e.g., a second local computing device). This may be done, for example, for remote monitoring of user applications on one or more clients by an administrator. In a similar embodiment, a local computing device may transmit graphical output data of a locally-hosted application to a server, such as a remote computing device, to allow the locally-hosted application to be seamlessly integrated into a remote desktop (e.g., the desktop of the remote computing device).

Figure 4A:
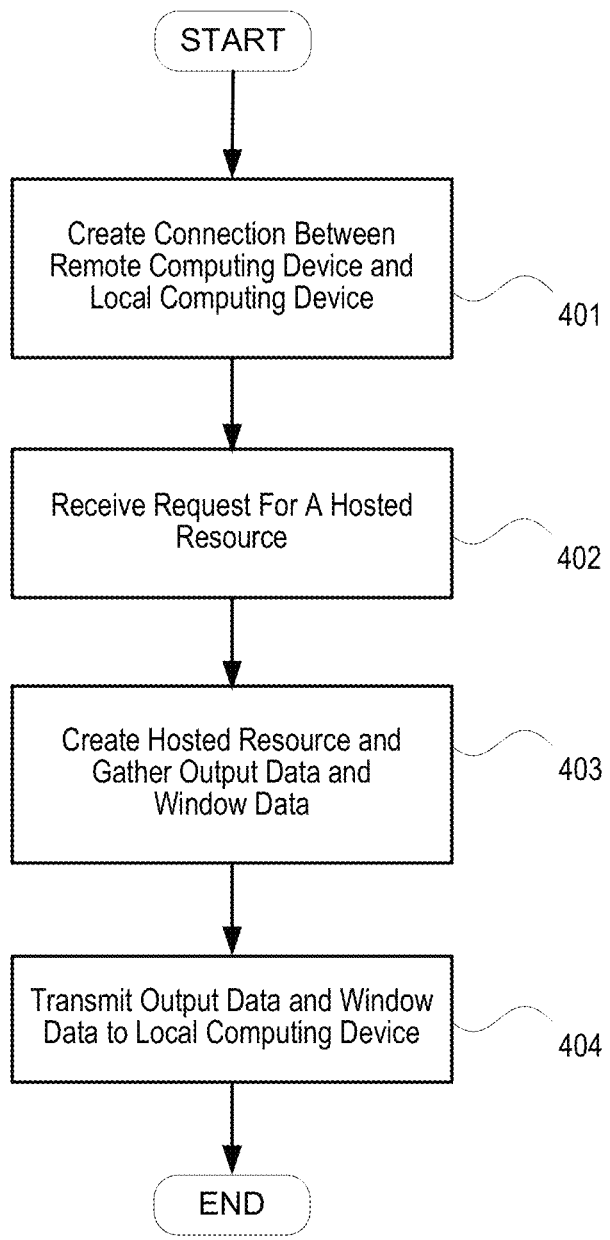
FIGS. 4A through 4C are example methods for modifying a taskbar of a local desktop environment with a resource from a remote computing device according to various aspects described herein.
Figure 4B:
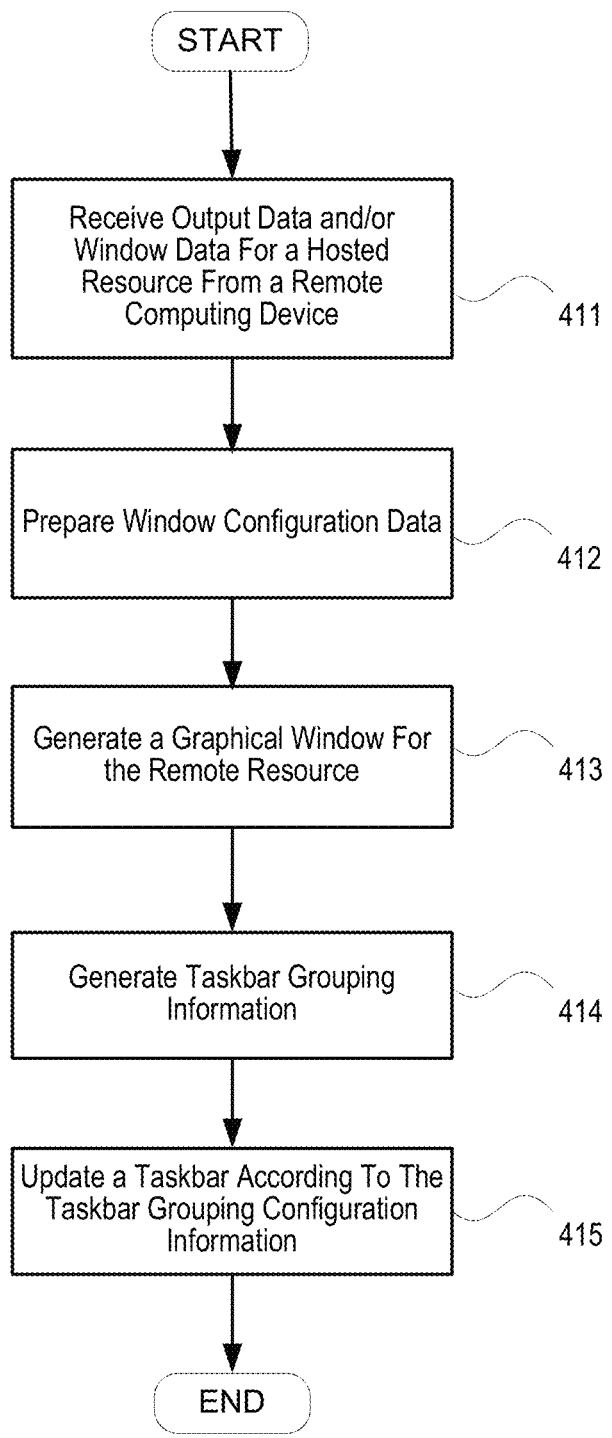
Figure 4C:
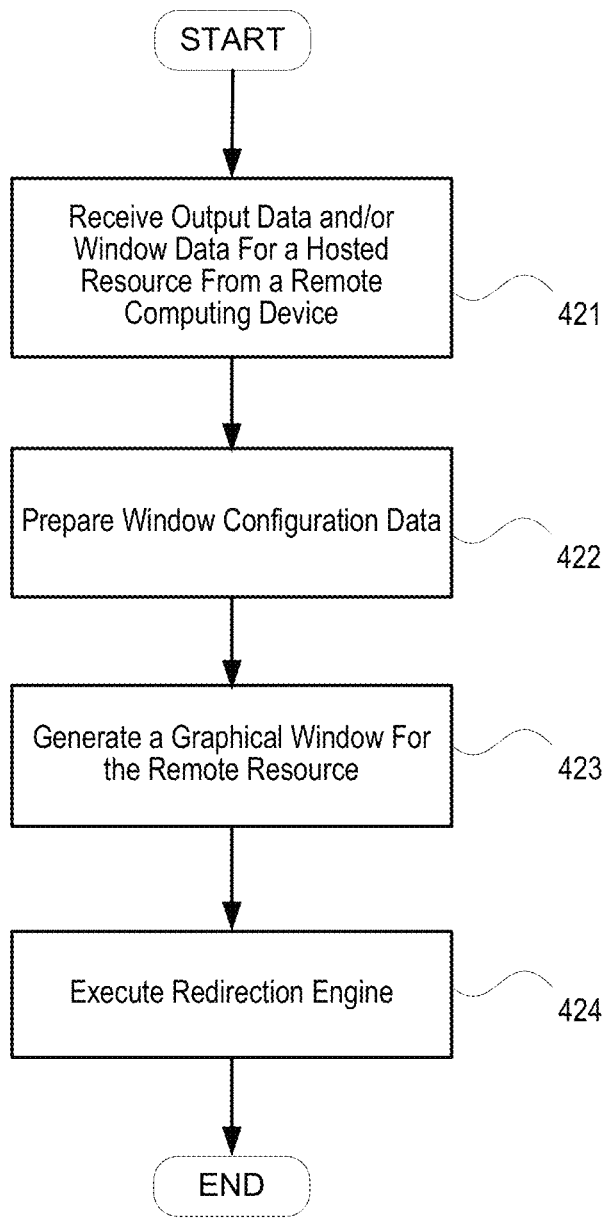

FIGS. 4A through 4C are example methods for modifying a taskbar of a local desktop environment with a resource from a remote computing device. In particular, the FIG. 4A example is a method suitable for use at a remote computing device to receive requests for resources from a local computing device and provide the requested resource to the local computing device. In some arrangements, various steps or features of FIG. 4A may be performed by a hosting management engine.

At step 401, a remote computing device may create a connection between the remote computing device and a local computing device. In some embodiments, the local computing device may initiate the connection. For example, a user may, using a browser or other suitable application on the local computing device, log in to the remote computing device and, upon authentication, the remote computing device may allow the user access to resources hosted by the remote computing device. In one or more arrangements, the browser at the local computing device may display the various resources available to the user.

At step 402, the remote computing device may receive a request for a hosted resource. For example, a user may request the remote computing device to create a document using Microsoft Word, with both the document and Microsoft Word being executed by the remote computing device. As another example, a user may request the remote computing device to host a browser application, or e-mail application (e.g., Microsoft Outlook).

At step 403, the remote computing device may create the hosted resource requested in step 402 and may gather output data and window data related to hosted resource. For example, the remote computing device may instantiate, open or otherwise begin executing the hosted resource. The remote computing device may also gather output data and window data that can be used by the local computing device when rendering a graphical window for the hosted resource. As discussed above, the output and/or window data may include data used to prepare, render or include in a graphical window for a hosted resource. For example, the gathered data may include a window handle, size, position, transparency value, a resource or process name, file system path, application ID or other identifier, a description of the resource, or other details. The gathered data may also include graphical or textual content for display in a graphical window.

To gather the output data and window data, the remote computing device may access various components including, the hosted resource itself, the operating system of the remote computing device, and/or a hosting management engine. In one embodiment, a query to the operating system of the remote computing device may be performed to retrieve an identification of a window generated when the hosted resource was created. In one example, the remote computing device retrieves an application identifier for the window of the hosted resource (e.g., by calling a GetValue( ) function of the IPropertyStore interface provided in some versions of Microsoft Windows to retrieve the PKEY_AppUserModel_ID property of the window). In some variations, the operating system may be queried to retrieve an identification of a process that generates portions of the output data and window data (e.g., query a dynamically linked library of the operating system). In one example, the remote computing device may use an application programming interface (API) provided by the operating system, such as the NtQueryInformationProcess API provided in some versions of Microsoft Windows in the ntdll.dll library. One API call may retrieve a structure that includes an indication of whether the application identifier has been explicitly set (e.g., set by the manufacturer of the resource). When the application identifier is not explicitly set, some embodiments may ignore any application identifier included in the retrieved structure. Other variations of gathering output data and window data include, among others, information using a window handle when creation of a new window is detected, and retrieving an identification of the resource or a process that generated the resource (e.g., a file system path to the application that created the document) from the operating system of the remote computing device, and retrieving other identifiers and information related to the hosted resource (e.g., a process identifier (PID), a user identifier (UID), a file location or path, file description, time of launch, memory register number).

Additionally, in one or more arrangements, the remote computing device may filter the gathered output and window data dependent on the operating system used by the local computing device. As will be discussed in more detail below, the information needed to generate a window for a hosted resource and/or modify various components of the local desktop environment may depend on the operating system of the local computing device. In some instances, the remote computing device may be informed of what operating system is being used by the local computing device. Thus, the remote computing device may discard or ignore any information of the output data and window data that is not needed by the local computing device.

At step 404, the remote computing device may transmit the output data and window data to the local computing device.

Figure 5A:
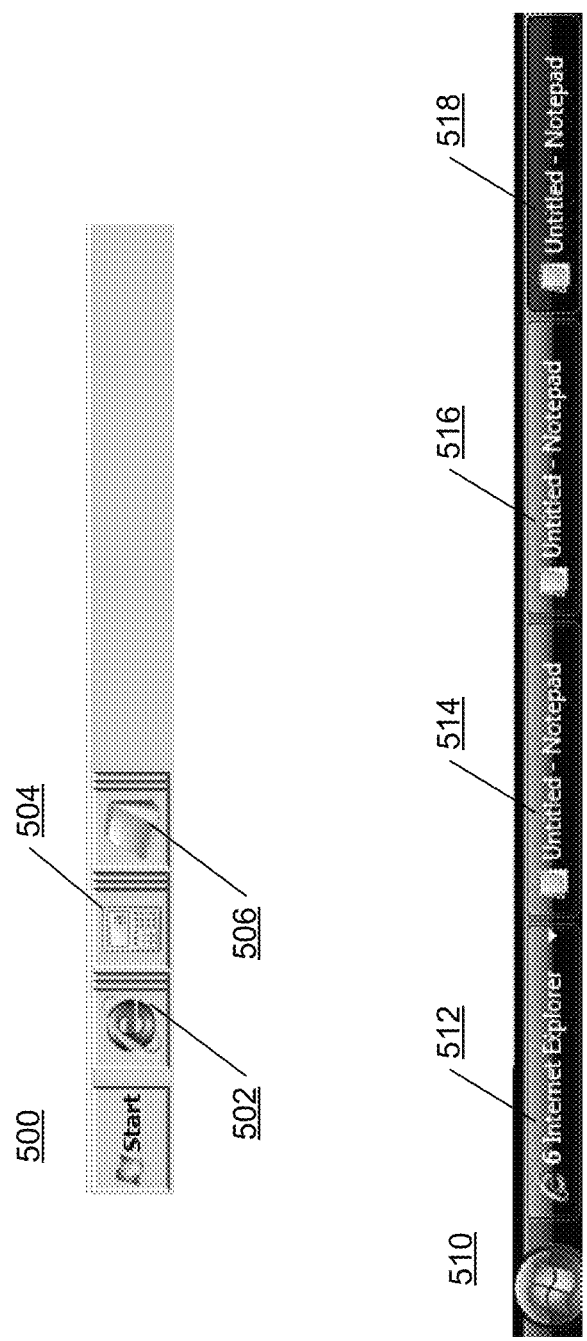
FIG. 5A illustrates two example taskbar groupings according to various aspects described herein.

The FIG. 4B example is a method suitable for use at a local computing device to modify a taskbar of the local computing device's desktop environment. In some arrangements, various steps or features of FIG. 4B may be performed by a client management engine. Further, the FIG. 4B example is suitable for operating systems that utilize a taskbar with icon groups. For example, Windows 7, uses application identifiers (AppIDs) to determine how to group taskbar buttons. Each window in the desktop environment may be assigned an AppID, which may be the same as or different than AppIDs of other windows. In some variations AppIDs may be explicitly set by a producer or manufacturer of a resource (e.g., Microsoft Word may be designated a particular AppID). When an operating system detects two taskbar buttons with the same AppID, the operating system may group these buttons into a single taskbar icon group. In some arrangements, AppIDs may be set by a computer. In one example, the file system path to the process that created the resource or the window for the resource (e.g., "D:\Application Server\Remote Applications\Program Files\My Computer\My Application.exe") may be translated into a string for use as the AppID. Additionally, if an application or resource generates multiple windows, each window may be given the same AppID. FIG. 5A illustrates two example taskbar groupings. In particular, taskbar 500 includes a grouping for browser resources 502, calculator resources 504, and notepad resources 506. Each group may be displayed as a stack of buttons corresponding to the number of windows in the group. As shown, taskbar 510 includes a grouping for browser resources 512, and separate buttons for different notepad windows (e.g., notepad window 514, 516 and 518). In some instances, if another notepad window was created, taskbar 510 may be updated to include a grouping for the notepad resources with notepad window 514, 516, 518 and the new window for the new notepad resource.

Referring again to FIG. 4B, at step 411, the local computing device may receive output data and/or window data for a hosted resource from a remote computing device. The hosted resource may also be referred to as a remote resource. In some arrangements, upon receipt, the local computing device may store the output data and/or window data such as, for example, within a hash table.

At step 412, the local computing device may prepare window configuration data. In some embodiments, window configuration data may be the same as the output data and the window data received in step 411. In others, the window configuration data may be based on the received output and window data. For example, in some instances, the received data may include a file system path that identifies a path determined by the remote computing device (e.g., "D:\Application Server\Remote Applications\Program Files\My Company\My Application.exe"). The local computing device may modify the file system path by replacing a portion of the path with a local path, such as one that corresponds to the location of the Program Files folder of the local computing device (e.g., replace "D:\Application Server\Remote Applications\" of the above path with "C:\" resulting in a modified path of "C:\Program Files\My Company\My Application.exe"). In other words, the modified file system path may include a combination of a local path and a remote path. Other information from the output and window data could be similarly modified to be tailored to the file system of the local computing device (e.g., modifying data for the window title to include text indicating that the window is for a remote resource such as by including "Remote" in the window title). As another example, the local computing device may prevent certain windows from being generated by the local computing device. Some windows represented by the output and window data may correspond to pop-up windows, alerts, error messages, etc., and the local computing device may be configured to identify any of these window types and remove them from the window configuration data.

At step 413, the local computing device may generate a graphical window for the remote resource. In one or more embodiments, the local computing device directs or interfaces with the operating system of the local computing device to create a graphical window for the remote resource. The graphical window may be created according to the window configuration data. For example, a graphical window may be created with the AppID, process name, process file system path, etc., of the window configuration data. Additionally, the graphical window may be created with the size, location, or window type specified by the window configuration data. In some instances, the graphical window is created to include the window configuration data. In others, creating a graphical window includes creating an initial graphical window and then modifying associations and/or data of the graphical window according to the window configuration data. For example, the local computing device may assign identifiers (e.g., AppID, etc.) of the window configuration data to the created graphical window. Assigning the identifiers may replace the initial attributes of the created graphical window. In one particular example, a SetValue( ) method of the IPropertyStore interface provided in some versions of Microsoft Windows may be used to set the PKEY_AppUserModel_ID property of the created graphical window.

Additionally, generating the graphical window may directly present the window within a desktop environment of the local computing device. In some variations, such direct presentation may result in each remote resource having its own distinct window presented within the desktop environment of the local computing device, as opposed to being presented indirectly on the local computing device. Indirect presentation methods may include, for example, a method that results in each window of the remote resources being indirectly presented within a single window representing a desktop environment of the remote computing device (e.g., as sub-windows).

Figure 5B:
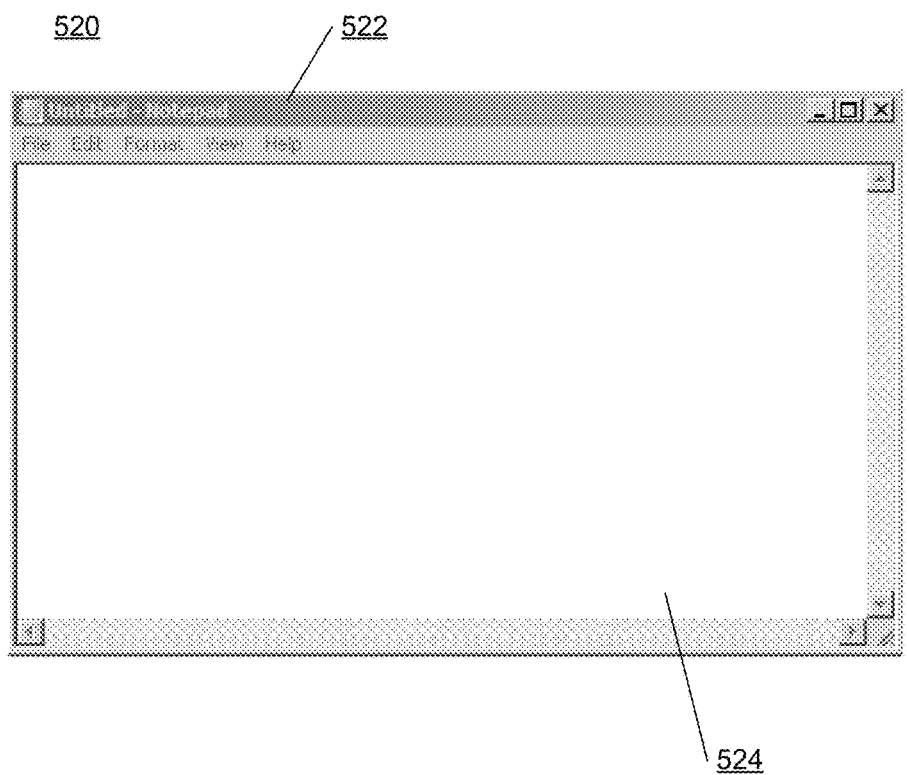
FIG. 5B illustrates an example graphical window displayed on a local computing device for a resource of a remote computing device according to various aspects described herein.

FIG. 5B illustrates an example graphical window displayed on a local computing device for a resource of a remote computing device. As illustrated in FIG. 5B, graphical window 520 may include a title bar 522 and resource content portion 524. Title bar 522 includes various information describing the remote resource, including, for example, a file name (e.g., "Untitled"), an application name associated with the remote resource (e.g., "Notepad"). Resource content portion 524 may include the content of the window, such as graphical and/or textual content.

One or more other windows may also be displayed on the local computing device's desktop environment. In some instances, these other windows may be a mixture of windows for local resources (e.g., a window for a browser being executed by the local computing device) and windows for remote resources (e.g., a window for a text editor executed by the remote computing device). The appearance of the windows may be generally similar. For example, a window for a local resource may also include a title bar and a resource content portion.

Referring again to FIG. 4B, at step 414, the local computing device may generate taskbar grouping configuration information. In some embodiments, the local computing device may retrieve a listing or enumeration of toolbar button identifiers in a taskbar. For example, the local computing device may query the operating system (e.g., using a "TB_GETBUTTON" command) to retrieve the listing. As another example, the local computing device may maintain a listing of windows (or the toolbar buttons for the windows) in the local computing device's desktop environment. The local computing device may determine that the remote resource is substantially similar to another resource with a window in the desktop environment or to a taskbar group identified in the received listing. Similarity can be determined, for example, by comparing various identifiers from the window configuration data to other identifiers of the windows or toolbar buttons, such as by comparing the AppID of the remote resource to other AppIDs of existing windows of the local desktop environment. If the AppIDs, for example, are the same, the toolbar group corresponding to the AppID can be identified and the identified toolbar group may be part of the toolbar configuration information to define the group the remote resource is to be placed into. The comparison may also generate additional taskbar configuration information. For example, if the AppIDs have been compared and determined to be similar, various identifiers of the remote resource can be assigned values based on identifiers of the resource with the similar AppID. In some arrangements, the local computing device may process file path data to identify a taskbar group for the remote resource. If a taskbar group is not found within the taskbar (e.g., the taskbar does not include a taskbar group with the same or similar application identifier or file path), the local computing device may use the application identifier or file path data to identify a new taskbar group for the remote resource that may be added to the taskbar. Additionally, in some variations, the local computing device may analyze the taskbar grouping and determine a changed taskbar grouping for the taskbar groups (e.g., divide a taskbar group into two different taskbar groups, combine two taskbar groups, add a taskbar button that already existed on the taskbar to a taskbar group, etc.).

In some arrangements, step 414 may precede step 413. In others, step 414 may be performed as part of step 413.

Figure 5C:
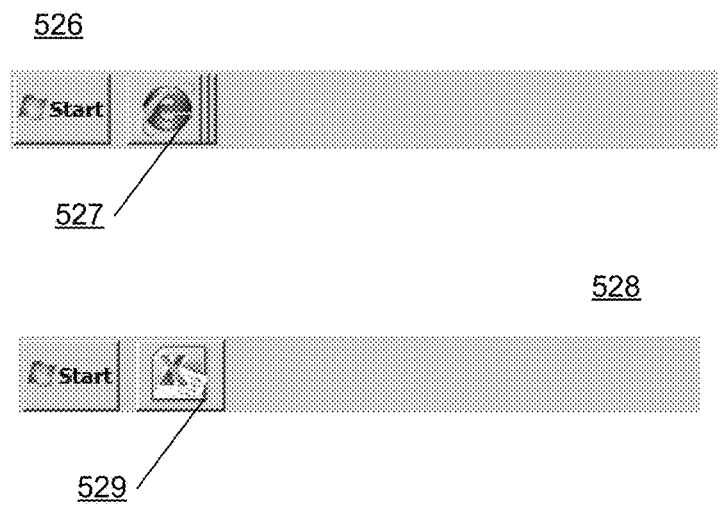
FIG. 5C illustrates two examples of updated taskbars according to various aspects described herein.

At step 415, the local computing device may update a taskbar according to the taskbar grouping configuration information. In some instances, the taskbar grouping configuration information may include an identification of an existing taskbar group that the remote resource will be added into. Additionally, the taskbar grouping configuration information may include an identification of a new taskbar group to create for the remote resource. In some variations, creating a taskbar group may comprise using a command such as TB_MOVEBUTTON to populate the group and associate the remote resource with the group. In accordance with the information, the taskbar can be updated appropriately, such as by creating a new taskbar group in the taskbar (the newly created group may include an identifier of the remote resource) or adding one or more identifiers for the remote resource to an existing taskbar group. In one or more embodiments, a taskbar group may have a button style of BTNS_DROPDOWN. FIG. 5C illustrates two examples of updated taskbars. In particular, taskbar 526 includes group 527 for a browser application that the remote resource has been added into. Taskbar 528 includes group 529 for a spreadsheet application that was created for the remote resource.

Figure 5D:
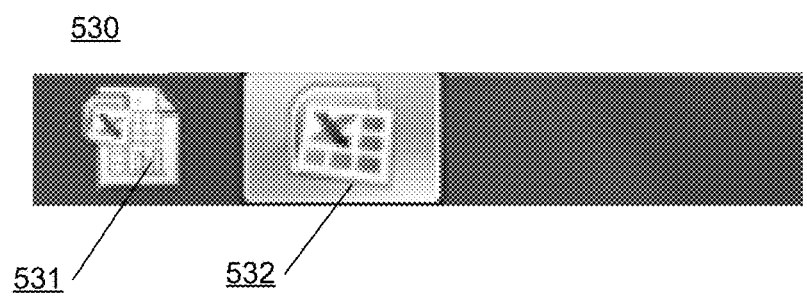
FIG. 5D illustrates an example taskbar where local resources and remote resources are placed into different groups according to various aspects described herein.

In some embodiments, a user may specify whether to enable or disable the functionality for combining remote resources into groups that include local resources. FIG. 5D illustrates an example taskbar where local resources and remote resources are placed into different groups. In particular taskbar 530 includes taskbar group 531 for resources of a spreadsheet application that are locally hosted and taskbar group 532 for resources of a spreadsheet application that are remotely hosted. As illustrated by FIG. 5D, both groups 531 and 532 are for the same spreadsheet application, Microsoft Excel.

Figure 5E:
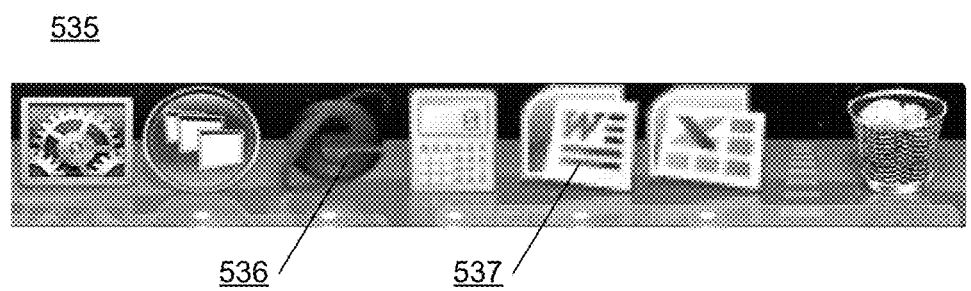
FIG. 5E illustrates an example docking taskbar according to various aspects described herein.

The FIG. 4C example is another method suitable for use at a local computing device to modify a taskbar of the local computing device's desktop environment. Further, the FIG. 4C example is suitable for operating systems that utilize a taskbar with docking. For example, the Macintosh Operating System utilizes a dock. With a docking taskbar, only one button or icon for an application type is shown on the taskbar. Grouping with a docking taskbar is based upon the application that generated the window. The method of the FIG. 4C example may be repeated for each window that is to be generated by the local computing device for a remote resource. FIG. 5E illustrates an example docking taskbar. Docking taskbar 535 includes various icons corresponding to different applications, including, for example, icon 536 for a browser application and icon 537 for a word processor application.

Referring again to FIG. 4C, at step 421, the local computing device may receive output data and/or window data for a hosted resource from a remote computing device (e.g., a remote resource). This step may be similar to step 411 of FIG. 4B.

At step 422, the local computing device may prepare window configuration data. This step may be similar to step 412 of FIG. 4B.

At step 423, the local computing device may generate a graphical window for the remote resource. This step may be similar to step 413 of FIG. 4B.

At step 424, the local computing device may execute a redirection engine. In some embodiments, the redirection engine may be an application, daemon, script or other process for redirecting user interaction such that it appears that the user is interacting with the graphical window for the hosted resource. In one or more variations, the redirection engine may identify the icon of the remote resource from the received output and window data, and provide it to the operating system so that the operating system may update the taskbar to include the icon (e.g., icon 537 of FIG. 5E is placed into the docking taskbar for the redirection engine). In some arrangements, the local computing device may request the icon from the remote computing device.

The operating system of the local computing device may associate the icon with the redirection engine. For example, when a user selects the icon on the taskbar, the redirection engine may be placed in an active state. The redirection engine may be placed into an active state by various interactions with the local desktop environment, such as, by clicking on the graphical window that was generated in step 422 when another application or window has focus (e.g., is in the foreground of the desktop) or by alt-tabbing to the graphical window. When placed in an active state, the redirection engine may redirect user interaction such that it appears to a user that they are interacting with the remote resource. For example, in one or more arrangements, when in the active state, the redirection engine may direct the desktop environment of the local computing device to bring the graphical window to the foreground of the desktop environment so the user may directly interact with the graphical window. In some variations, the redirection engine may redirect user interaction to the local management engine, which among other things, may bring the graphical window to focus and/or communicate data (e.g., user input such as text to be added to a document, user selections of content, etc.) to the remote computing device for processing.

In some arrangements, a redirection engine may be associated with only one window. For example, if multiple remote resource windows are created on the local desktop environment, a redirection engine is created for each window. Alternatively, in some embodiments, the redirection engine may be associated with multiple windows. In other words, the icon inserted into the docking taskbar for the redirection engine is associated with multiple windows of the local desktop, with each of the multiple windows being for a remote resource. For example, the redirection engine may be associated with all remote resources being provided at the local computing device. As another example, the redirection engine may be associated with remote resources for a single application. More particularly, the local computing device may compare various identifiers of the window configuration data for a new remote resource to data for a redirection engine's associated graphical window (e.g., a comparison between an application identifier of the new remote resource and the application identifier for a previously created graphical window for another remote resource, such as one created in step 422 of FIG. 4C). If the local computing device determines that the new remote resource is similar or the same as windows associated with the redirection engine (e.g., one or more identifiers are identical), then the local computing device may interact with the operating system to associate a graphical window for the new remote resource with the dock for the redirection engine (e.g., icon 537 of FIG. 5C may be associated with two windows, each window being for a particular word processing application). Otherwise, the local computing device may create a second redirection engine and associate the graphical window for the new remote resource with the icon for the second redirection engine that was inserted into the docking taskbar (e.g., icon 537 of FIG. 5C may be associated with a first redirection engine executing on the local computing device and icon 536 may be associated with a second redirection engine executing on the local computing device).

The determination of whether a new remote resource is similar or the same as other remote resources can be performed in various other ways. For example, some applications may generate child windows, and the window configuration data may indicate the parent/child relationship (e.g., a drawing application may generate a second window, such as a toolbox of drawing tools). Analyzing such parent/child relationship data may cause the new remote resource to be associated with the redirection engine for the parent's graphical window. As another example, the windows may be grouped based on their functionality. In one particular example, windows for web pages may be grouped to the same icon on the docking taskbar, while web applications may be grouped into a different icon, even though the windows for the web pages and web applications are for the same browser application.

Additionally, in some variations, a redirection engine may remain executing for as long as an associated graphical window exists in the local desktop. For example, if a redirection engine is associated with multiple windows, closing one of the associated graphical windows would not close the redirection engine. Only when all graphical windows have been closed may the redirection engine also close.

In some embodiments, a user may be able to interact with a taskbar or other components of the local desktop environment to display thumbnail previews of the windows associated with a taskbar group. FIGS. 6A through 6E illustrate example previews for a taskbar group. In some embodiments, previews for the taskbar groups can be shown, for example, responsive to a user clicking on or hovering over an icon on the taskbar. Additionally, the previews may be shown responsive to a designated key press or user interaction (e.g., moving the mouse pointer to a specific location of the desktop environment). A user may be able to select a particular preview entry or thumbnail to bring the corresponding window to the foreground of the desktop environment. Microsoft Windows and Mac OS are two examples among many operating systems that provide preview functionality.

Figure 6A:
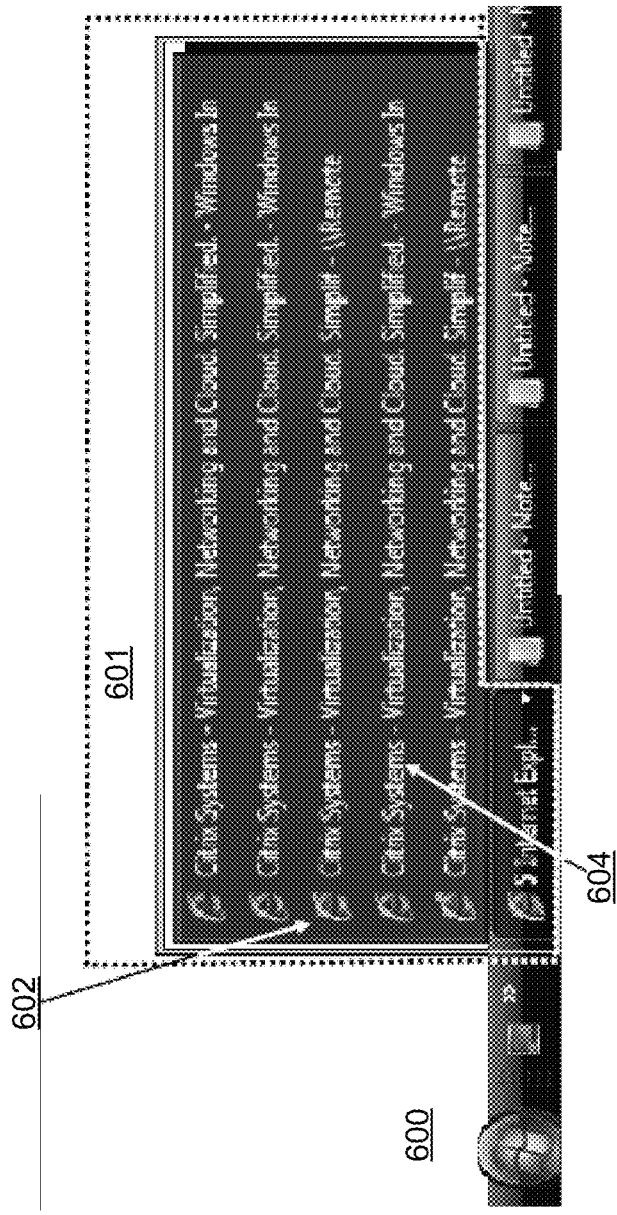
FIGS. 6A through 6E illustrate example previews for a taskbar group according to various aspects described herein.
Figure 6B:
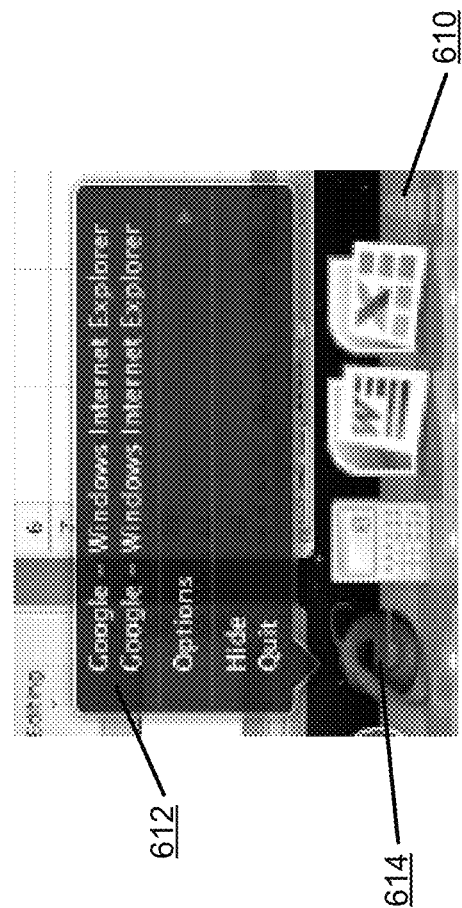

In particular, FIG. 6A illustrates a taskbar 600 with group preview 601. The preview portion of group preview 601 includes an entry for each window that is part of the taskbar group. For example, entry 602 is for a window of a remote resource and entry 604 is for a different window of a local resource. FIG. 6B illustrates docking taskbar 610 with preview 612 of icon 614 that was inserted into docking taskbar 610. As shown, preview 612 shows two entries, with each entry corresponding to a particular window of the desktop environment that are part of group 614. The data for each entry of the previews (e.g., the icon and the text) shown in FIGS. 6A and 6B may be set when each window is created (e.g., step 413 of FIG. 4B; step 423 of FIG. 4C) or when the taskbar is updated for each window (e.g., step 415 of FIG. 4B, or when an icon for a redirection engine is inserted into a docking taskbar).

Figure 6C:
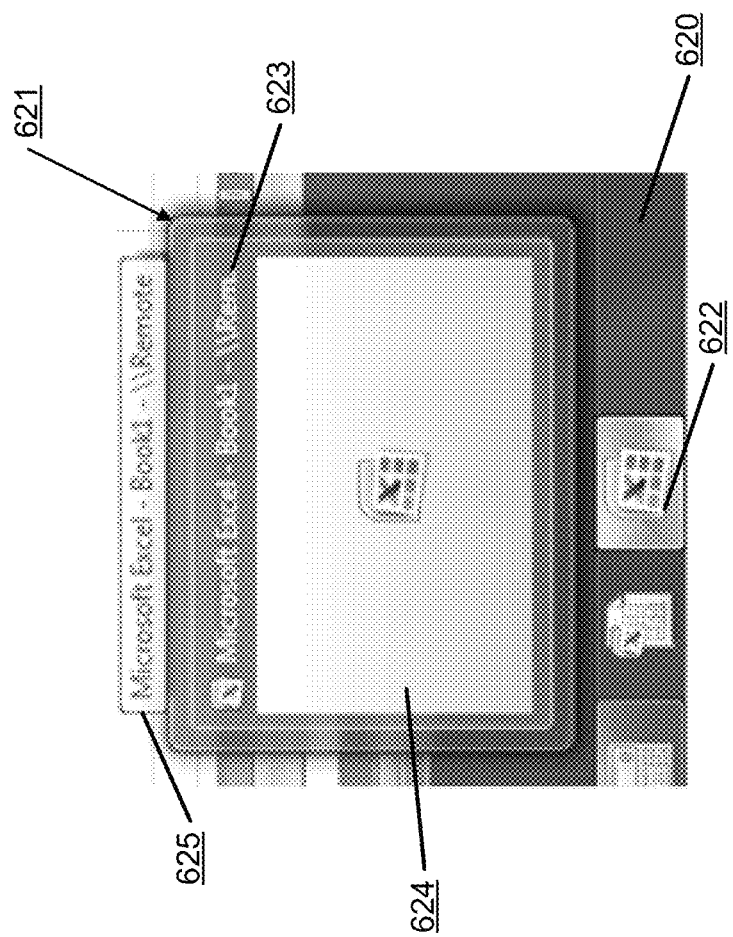
Figure 6D:
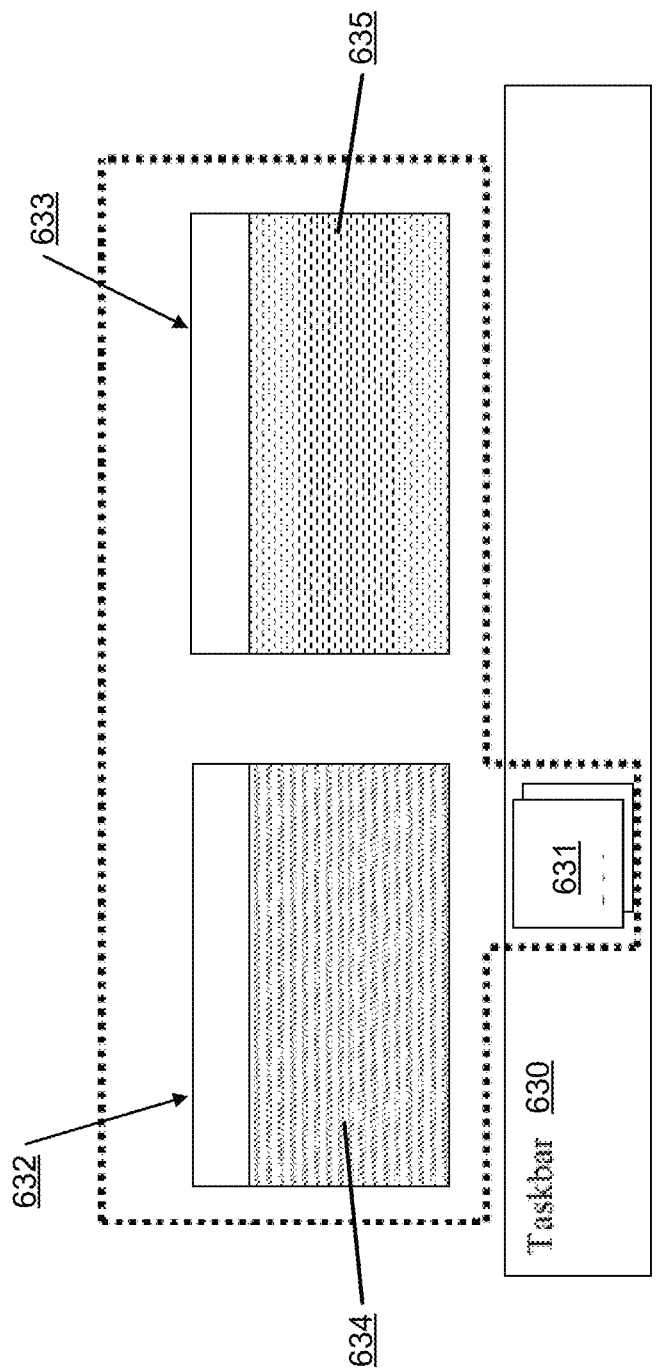

FIG. 6C illustrates a taskbar 620 with a thumbnail preview 621 for taskbar group 622. Thumbnail preview 621 may include a title portion 623 having an icon and/or text (e.g., a portion of the window title). Thumbnail preview 621 may also include a snapshot portion 624 that provides a snapshot, or otherwise reflects the appearance, of content of the associated graphical window. Alternatively, the snapshot portion 624 may include some other information if the snapshot is unavailable or otherwise disabled. As shown, snapshot portion 624 includes only an icon. Additionally, in some variations, the thumbnail preview 621 may include one or more other identifiers, such as pop-up identifier 625. In some instances, a taskbar group may be associated with multiple windows and thumbnail previews may be generated for each of the associated windows that are similar to thumbnail preview 621. In some arrangements, the multiple thumbnail previews for a taskbar group may be organized horizontally above the taskbar group. FIG. 6D illustrates an example arrangement of multiple thumbnail previews. As illustrated in FIG. 6D, taskbar group 631 of taskbar 630 may be associated with two windows, and each window may be previewed. Accordingly, thumbnail preview 632 of the first window may be displayed and thumbnail preview 633 of the second window may be displayed. Thumbnail preview 632 may include a snapshot portion 634, which may include a snapshot of the first window or some other graphical information, and thumbnail preview 633 may include snapshot portion 635, which may include a snapshot of the second window or some other graphical information. Each snapshot may be different from each other when the windows display different graphics, text, etc.

Figure 6E:
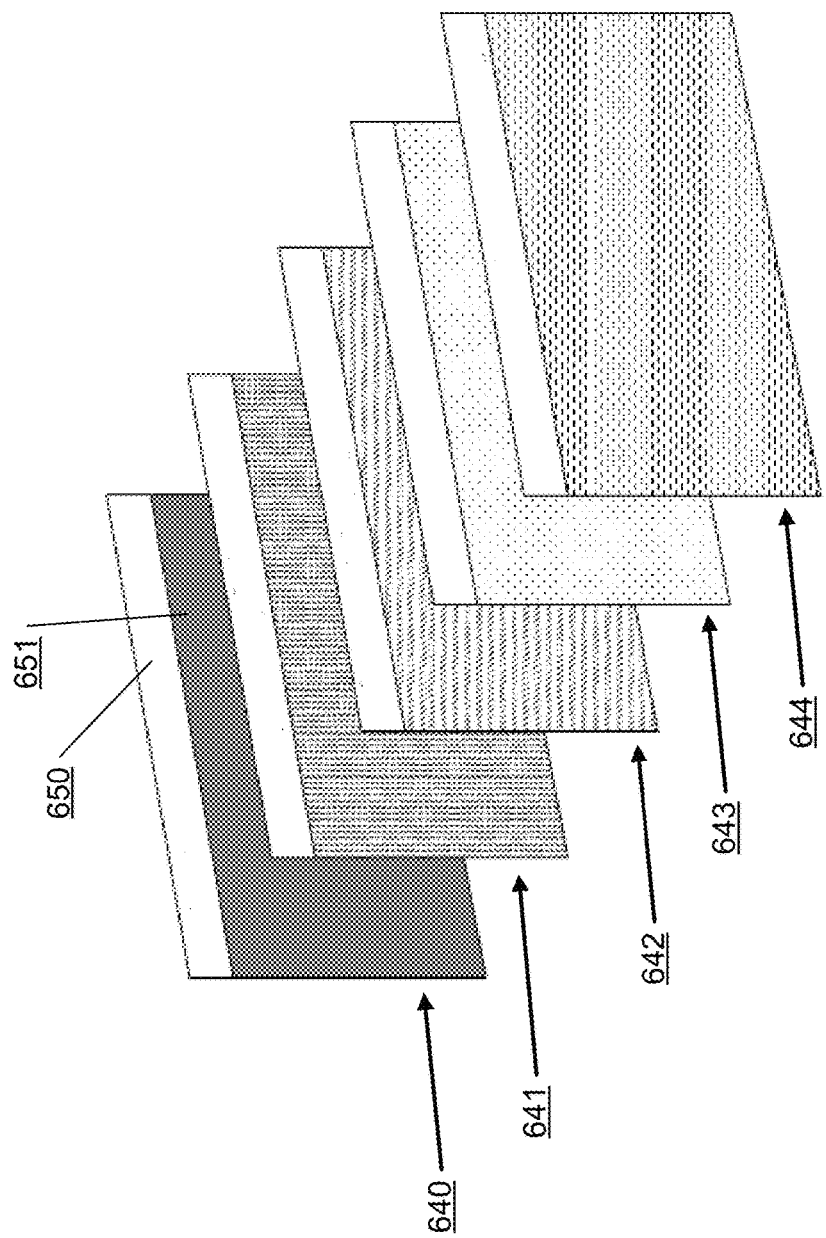

FIG. 6E illustrates a different embodiment of a window preview. As illustrated, five thumbnail previews are being shown: preview 640, 641, 642, 643 and 644. Each of the thumbnail previews may include a title portion (e.g., that includes an icon and/or textual data) and a snapshot of the window's content (or other graphic), such as title portion 650 and snapshot portion 651 for preview 640. In some arrangements, the example of FIG. 6E may be used as a 3D Flip interface, which allows a user to flip between thumbnails responsive to user interactions with the interface.

As discussed above, taskbar groups may include or be associated with graphical windows for remote resources. In some embodiments, remote resources may be differentiated from local resources in these previews by inclusion of text indicating to a user that the entry in the preview is for a remote resource (see, e.g., entry 602 of FIG. 6A). In some arrangements, snapshots for thumbnail previews (see e.g., FIGS. 6C, 6D and 6E) may be unavailable or otherwise disabled by the local computing device. When unavailable or otherwise disabled, the thumbnail previews for the remote resources may not include the snapshot of the window or, instead, may include another graphic such as, for example, an icon for the remote resource, an icon for an application that generated the remote resource, or an icon for the taskbar group (see e.g., content portion 624 of FIG. 6C). In some variations where snapshots for remote resources are unavailable or otherwise disabled, snapshots for local resources may be displayed in their thumbnail previews. Accordingly, remote resources of a thumbnail group may be differentiated by a user from local resources of the same thumbnail group.

Figure 7:
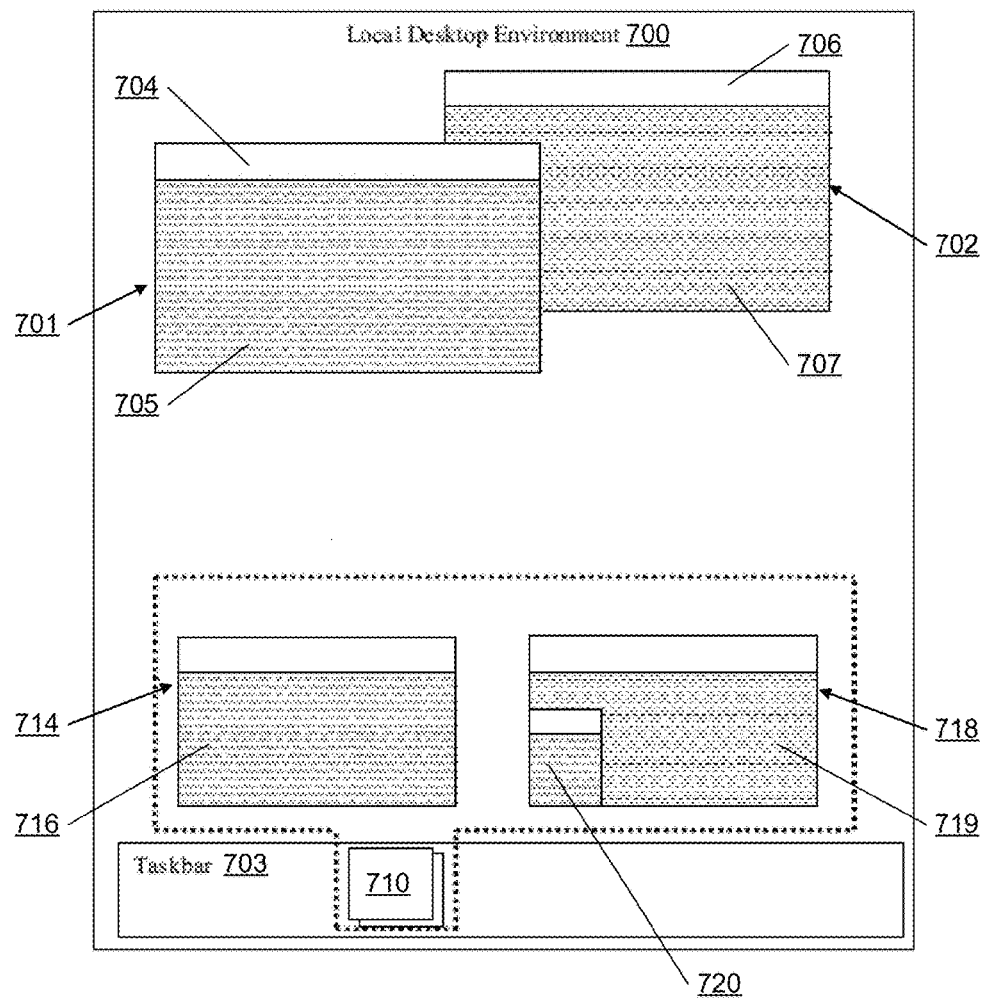
FIG. 7 illustrates an example desktop environment showing thumbnail previews created by a local computing device according to various aspects described herein.

In one or more embodiments, snapshots for windows of remote resources may be created by the local computing device. For example, the local computing device, when creating a snapshot for a remote resource may locate the window for the remote resource and take a snapshot (or screen scrape) of that location. However, the snapshot may not correspond to the actual contents of the remote resource window. Indeed, the window for the remote resource may be overlapped by other windows, or desktop environment may include multiple virtual desktops and the remote resource window may not be on the virtual desktop currently being displayed by the local computing device. FIG. 7 illustrates an example desktop environment showing thumbnail previews created by a local computing device. As illustrated, local desktop environment 700 may include remote resource window 701, remote resource window 702, and taskbar 703. Remote resource window 701 may include title bar 704 and content 705. Remote resource window 702 may include title bar 706 and content 707. Taskbar 703 may include taskbar group 710 and thumbnail previews for the two windows. Thumbnail preview 714 for remote resource window 701 may include snapshot 716 and thumbnail preview 718 for remote resource window 702 may include snapshot 719. Due to the overlap between remote window 701 and remote resource window 702, snapshot 719 may include a portion of window 701, which is denoted as item 720. In some arrangements, remote resource window 701 and remote resource window 702 may share the same two-dimensional Logical Video Buffer (LVB). In some instances, the two-dimensional LVB may be used by the local computing device to render graphical representations of the remote resource windows. Additionally, previews for overlapping windows may only be affected by the overlap if the overlapping windows share the same LVB. For example, previews for windows that overlap with each other, but do not share the same LVB, may be displayed without a portion of an overlapping window (e.g., a clean preview).

In one or more embodiments, a system that includes a local computing device and a remote computing device (e.g., a graphics remoting system) may be arranged with three-dimensional buffers. For example, each window (e.g., each window for a remote resource) may have its own LVB and/or sprite at both the local computing device and the remote computing device. Therefore, data for each window may be clean (e.g., free from corruption of other window's data), even if the window should become clipped or overlapped by another window when displayed. Accordingly, in some variations, a local computing device may always generate a window preview from the window's LVB/sprite to cleanly preview the window. There may be no need to request a snapshot from a remote computing device. In some arrangements, each window may have its own LVB/sprite at either the local computing device or the remote computing device.

In some embodiments, snapshots for windows of remote resources may be created with the remote computing device. One method of creating snapshots with the remote computing device is to continuously send snapshots of the window from the remote computing device to the local computing device. Additionally, snapshots for a foreground or active remote resource window may be sent more frequently than snapshots for other remote resource windows. Differential images that include only changes to the window content may be transmitted instead of entire images. Further, the snapshots (or differential images) may be transmitted in a compressed form.

Figure 8A:
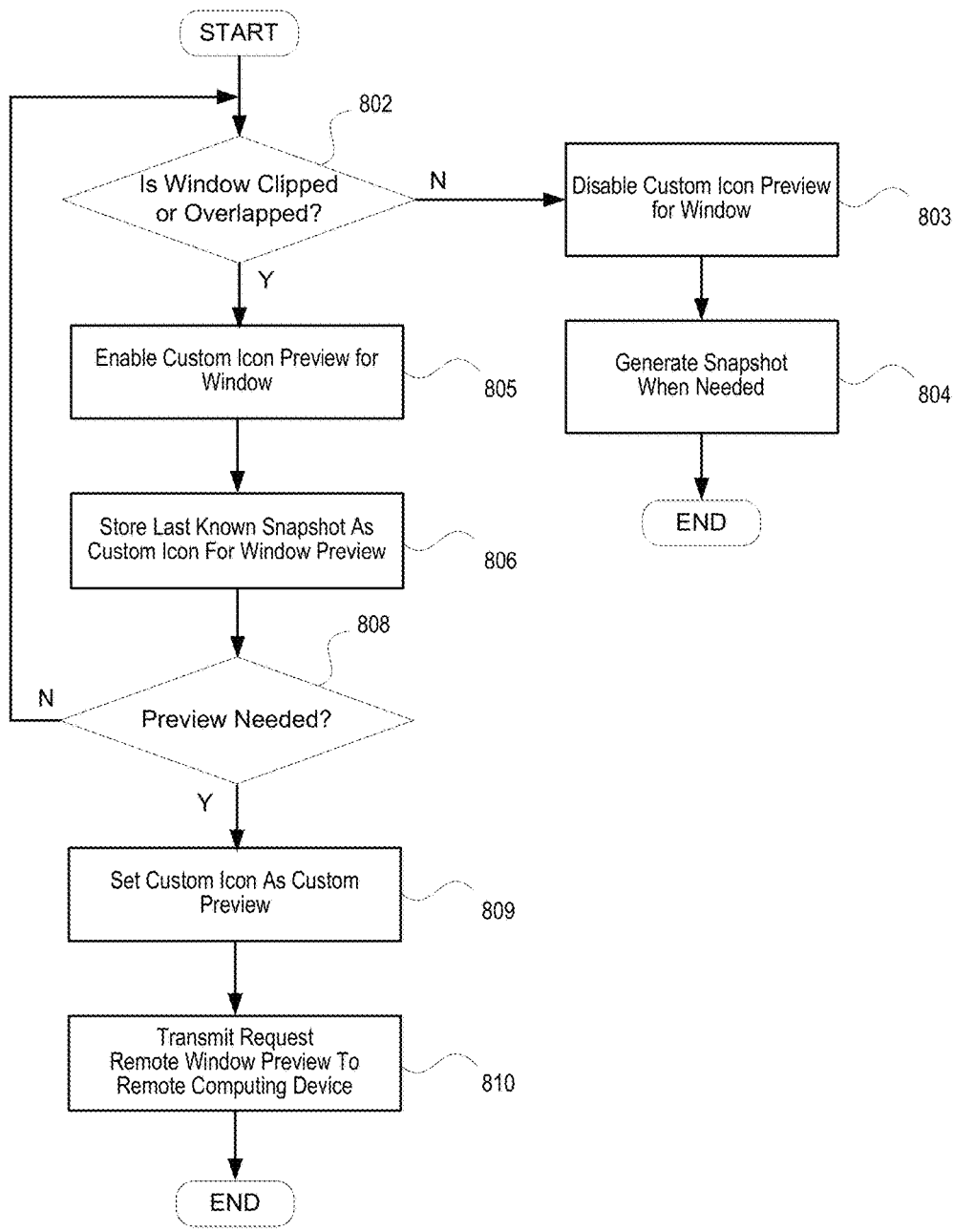
FIGS. 8A through 8D illustrate another example method for creating snapshots for a window of a remote resource with a remote computing device according to various aspects described herein.
Figure 8B:
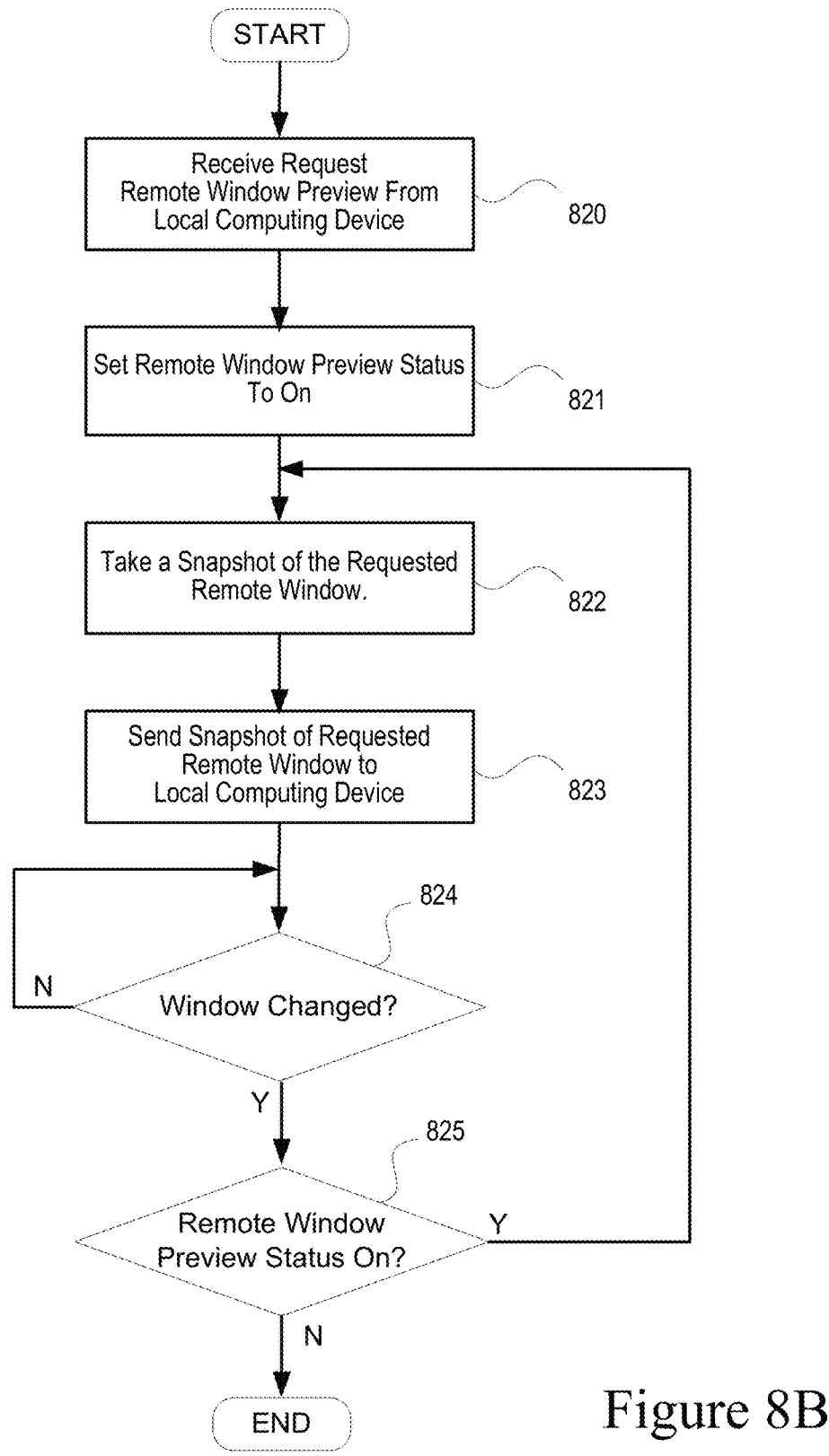
Figure 8C:
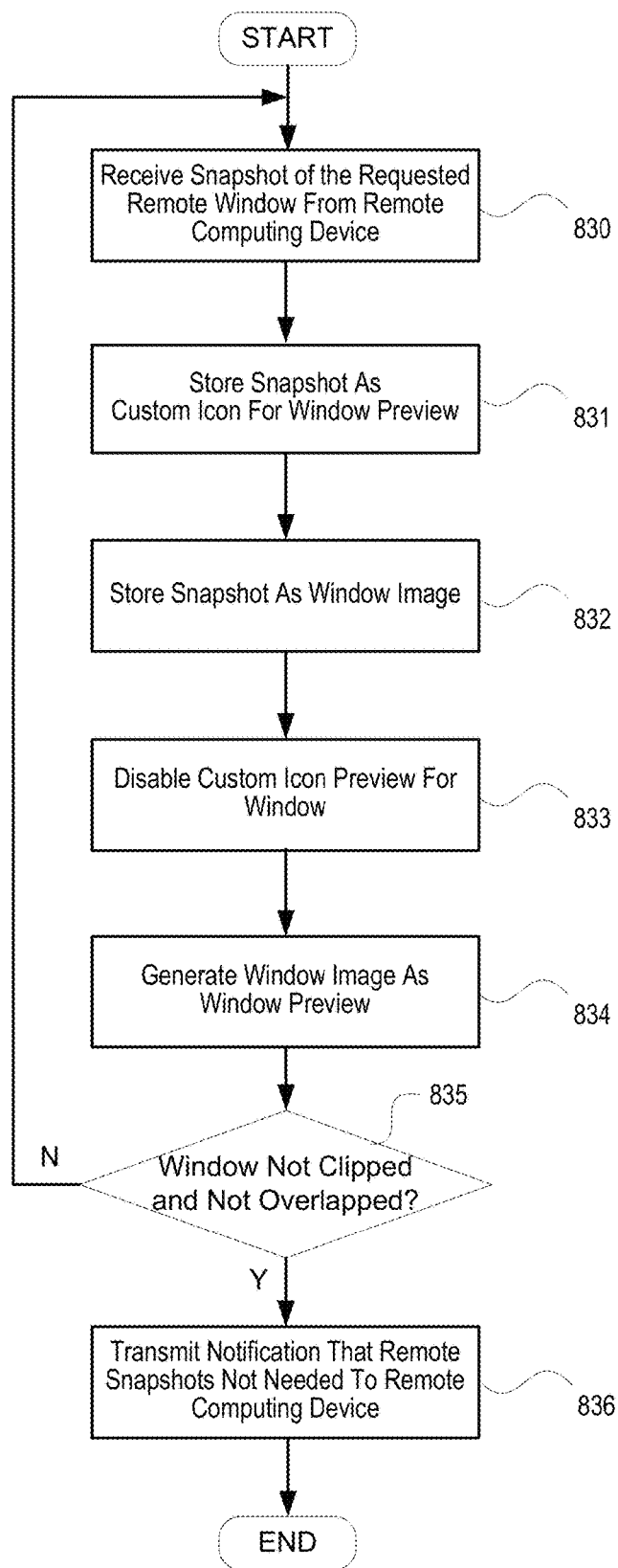
Figure 8D:
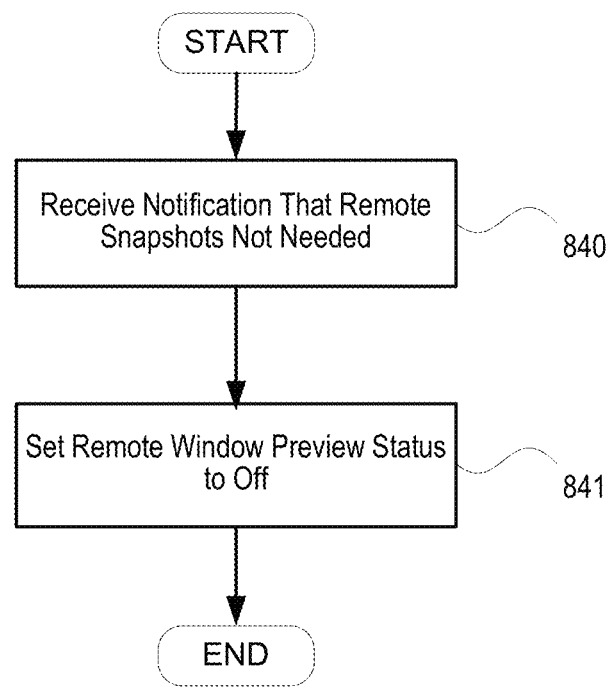

FIGS. 8A through 8D illustrate another example method for creating snapshots for a window of a remote resource with a remote computing device. In particular, FIGS. 8A and 8C illustrate portions of the example method that may be performed at the local computing device. In some arrangements, various steps or features of FIGS. 8A and 8C may be performed by a client management engine. FIGS. 8B and 8D illustrate portions of the example method that may be performed at the remote computing device. In some arrangements, various steps or features of FIGS. 8B and 8D may be performed by a hosting management engine.

FIG. 8A illustrates an example method for transmitting requests for window snapshots to a remote computing device. At step 802, the local computing device may determine whether the window for the remote resource is clipped or overlapped. A window can be clipped by a taskbar or other element of the desktop environment, such as an edge of the displayed environment. In one example, a window may be clipped by an edge of a two-dimensional LVB used for rendering. A window may be overlapped by other remote windows being displayed in the desktop environment. Clipping may be detected by monitoring the size, position and/or z-order of the window for changes and comparing it with similar attributes of other remote windows presented in the local desktop environment. If the window for the remote resource is not clipped or overlapped, the method proceeds to step 803. Otherwise the method proceeds to step 805.

At step 803, the local computing device may disable a custom icon preview setting for the remote resource window. Disabling the custom icon preview may include setting a window attribute, such as DWMWA_HAS_ICONIC_BITMAP to FALSE using the DwmSetWindowAttribute method. In some arrangements, the local computing device may check the current state of the custom icon preview setting and disable the setting only if the current state is enabled.

At step 804, the local computing device may generate a snapshot of the remote resource window when needed. In some embodiments, this may be performed by a desktop manager of the operating system such as a compositing window manager. Previews may be generated for various interfaces, such as a taskbar preview, a Flip interface, a 3D Flip interface, a Peek interface, and the like.

At step 805, the local computing device may enable a custom icon preview setting for the remote resource window. Enabling the custom icon preview may include setting a window attribute, such as DWMWA_HAS_ICONIC_BITMAP to TRUE using the DwmSetWindowAttribute method. In some arrangements, the local computing device may check the current state of the custom icon preview setting and enable the setting only if the current state is disabled.

At step 806, the local computing device may store a last known snapshot as a custom icon for use as a window preview. In some instances, the last known snapshot may be a snapshot of the remote resource window that was previously received from the remote computing device. In other embodiments in which the local computing device may not have a last known preview image for the window, such as on the first execution of step 806, the local computing device may use an alternate image, such as an icon associated with the application. This may be displayed during preview for the time period until the local computing device receives a preview image from the remote computing device for the window, ideally just a short time period.

Additionally, the local computing device may monitor the local desktop environment and repeat steps 802-806 based on changes to the local desktop environment. For example, the position of a window, such as the remote resource window, may change and the steps may be repeated. Other changes to the local desktop environment that may cause the steps to be repeated include window size, z-order, and contents of the window, among others. In some variations, the monitoring may be performed periodically. Further, in some embodiments, the monitoring for changes to the local desktop environment may be performed in parallel with other processes of the local computing device.

At step 808, the local computing device may determine whether a window preview is needed for the remote resource window. For example, a window preview may be requested for taskbar previews and the Windows DWM may send a message to the window of WM_DWMSENDICONICTHUMBNAIL. As another example, when a window preview is requested for an element such as Peek, the Windows DWM may send a message to the window of WM_DWMSENDICONICLIVEPREVIEWBITMAP. The local computing device may determine a preview is needed when that message is received. If a window preview is needed for the remote resource window, the method may proceed to step 809. Otherwise, the method may proceed to step 802.

At step 809, the local computing device may set a custom icon for use as a custom preview of the remote resource window. In some arrangements, the setting may be responsive to a message received from an API such as the Windows DWM. In some variations, the local computing device may set the custom icon by sending the custom icon with a message by calling, for example, DwmSeticonicThumbnail or DwmSeticonicLivePreviewBitmap. By setting the custom icon, which was set in step 806 to be the last known snapshot of the remote window resource, a window preview of the remote resource window may be shown to the user while the local computing device waits for a snapshot to be received from the remote computing device, which is discussed in further detail below.

At step 810, the local computing device transmits a request for a remote window preview to the remote computing device. This request may include various information about the remote resource window, such as a HostID or other identifier of the requested remote resource window. Other information includes a window handle, a position of the window, a parent window of the remote resource window, or other information that uniquely identifies the remote resource window. In some embodiments, the request may be transmitted over a virtual channel between the local computing device and the remote computing device, such as the ICA Seamless or Control virtual channels. Additionally, in some arrangements, the request may identify multiple remote resource windows (e.g., request three remote resource windows if three windows are needed for a preview interface).

FIG. 8B illustrates an example method for sending window snapshots from a remote computing device. At step 820, the remote computing device receives a request for a remote window preview from the local computing device.

At step 821, the remote computing device may set a preview status of the remote resource window to on. This may be performed, for example, by setting a window attribute or flag of the window to a predetermined value or by using internal bookkeeping (e.g., a private variable of the hosting management engine).

At step 822, the remote computing device may take a snapshot of the remote resource window. In some arrangements, this may include taking or otherwise creating a snapshot of the desktop environment of the remote computing device. In some variations, the snapshot may take the form of an image bitmap or other form of window information. For example, a snapshot may be retrieved from memory by the remote computing device. In some arrangements, the memory being retrieved is dynamically updated by an application that generates the remote resource window. Various APIs may be used to retrieve a window snapshot. For example, an API such as the DwmpDxGetWindowsSharedSurface method of the DWM may be used to retrieve the unclipped remote resource window snapshot as a texture. As another example, an API such as a PrintWindow API may be used to retrieve a snapshot of the window.

Figure 9:
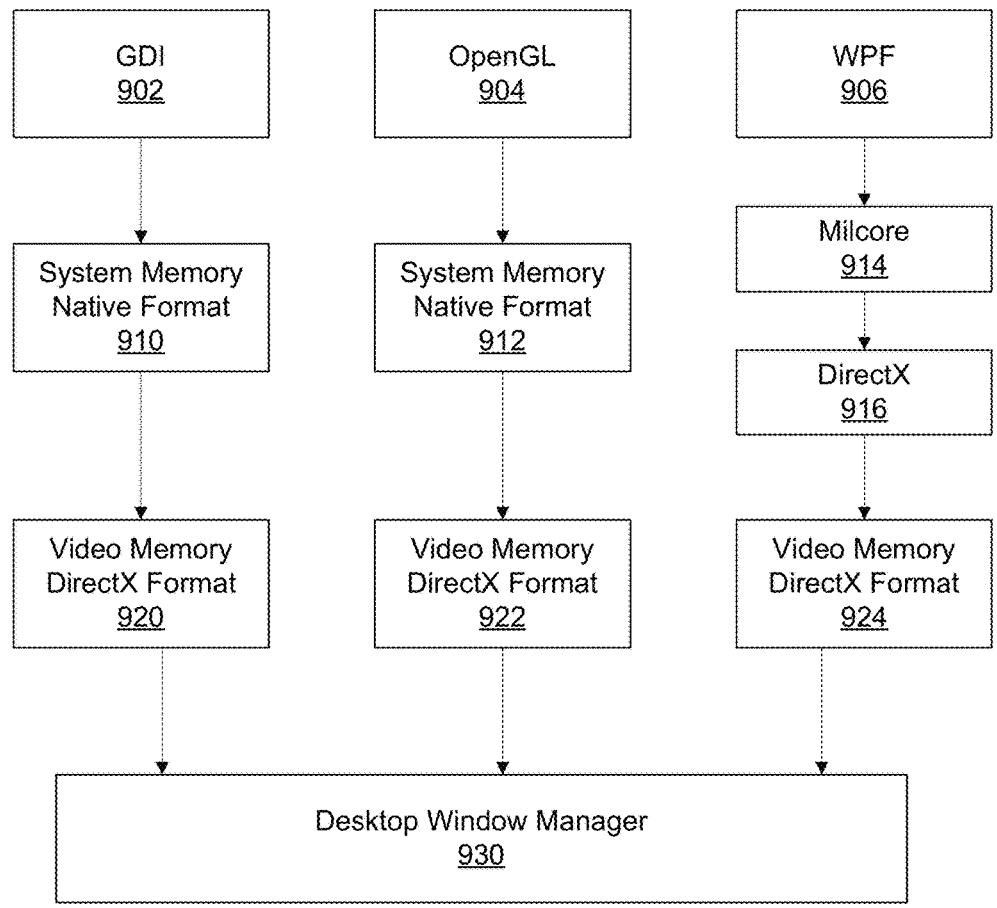
FIG. 9 illustrates an example block diagram that includes various sub-systems that may be used to create a snapshot according to various aspects described herein.

In some embodiments, the remote computing device may use various sub-systems of the computing device and/or operating system to assist in creating the snapshot. FIG. 9 illustrates an example block diagram that includes various sub-systems that may be used to create a snapshot. In some arrangements, the sub-systems of FIG. 9 may be used to provide three-dimensional thumbnails regardless of remote application type. Applications may use different APIs or graphics subsystems for displaying graphics, such as GDI 902, OpenGL 904, or WPF 906, among others. Some interfaces may manage data in a native format, such as system memory 910 in a native format for GDI 902, and system memory 912 in a native format for OpenGL 904. Other interfaces, such as WPF 906, may allow applications to render graphics to an off-screen surface or memory buffer. For example, WPF 906 may provide data for display by traversing data structures of milcore 914 (e.g., media integration layer core) and interfacing with a DirectX component 916. A compositing window manager, such as the Microsoft Windows Desktop Window Manager (DWM) 930, may composite each application's buffer into a final image for display. This may be considered as being distinct from older interfaces which used a stacking window manager in which each program wrote to a main buffer. In some arrangements, DWM-aware interfaces such as WPF may use a DWM-compatible format, such as DirectX, to maintain compatibility with older DWM-agnostic applications using GDI or OpenGL or similar interfaces. Further, dedicated buffers may be designated for each application. These applications may render in a native format, such as bitmaps, and then the buffer contents may be converted to a DWM-compatible format such as DirectX (e.g., video memory 920 including data in a DirectX format; video memory 922 including data in a DirectX format; and video memory 924 including data in a DirectX format).

Accordingly, in some instances, unclipped application images from each application may be in a DWM compatible format prior to compositing (e.g., video memory 920, 922 and 924), regardless of remote application type or graphics sub-system used. Therefore, by retrieving these image bitmaps and window information from the video memory prior to compositing, window content data may be accessed by another application or user interface element. This technique may be used for collecting live thumbnail previews of local applications for the Windows Flip3D and Peek interfaces, for example. However, it may be also used with remote applications using the systems and methods discussed herein. In some variations, the window content data may be unclipped by data from other windows and may be dynamically updated by the application generating the window. In embodiments using the Microsoft Windows Desktop Window Manager, an API such as the DwmpDxGetWindowsSharedSurface method of the DWM may be used to retrieve the unclipped window contents as a texture. This texture may then be used as the snapshot.

Additionally, in some variations, taking the snapshot may include creating a differential image. Creating a differential image may include comparing the snapshot taken in step 822 with a previously taken snapshot. In one or more arrangements, the remote computing device may perform an XOR between the new snapshot and the previous snapshot to create the differential image. In some instances, the remote computing device may not have a previous snapshot and, in such cases, the remote computing device may use a black image as the previous snapshot. The result of the comparison or XOR operation may be stored as the snapshot to send to the local computing device.

At step 823, the remote computing device may send a snapshot of the remote resource window to the local computing device. In some embodiments, the transmitted snapshot may be a differential image. Alternatively, the transmitted snapshot may be the full image. The remote computing device may set a flag or attribute in the transmitted snapshot or the message containing the snapshot to indicate whether the preview image is a differential image or a full image. The remote computing device may also convert or serialize the image into a device-independent bitmap image. In some variations, the snapshots (or differential image) may be transmitted in a compressed form. For example, the remote computing device may compress the snapshot using run length encoding (RLE), Joint Photographic Experts Group (JPEG), portable network graphics (PNG), or the like. Various other protocols may be used, such as, for example, video encoding protocols. Further, in some arrangements, the snapshot may be scaled prior to, after, or instead of being compressed. Other modifications to the snapshot may also be performed such as, for example, color depth conversion. Additionally, the remote computing device may repeatedly transmit the snapshot to the local computing device according to a periodic schedule. Such periodic transmission may be performed in parallel with other processes of the remote computing device. Further, the remote computing device may transmit snapshots of more than one window to the local computing device (e.g., transmit two windows for a request for snapshots of two remote resource windows).

At step 824, the remote computing device may determine whether the remote resource window has changed. For example, the remote computing device may use an API such as the Active Accessibility API provided by Microsoft to determine when the size or position of the remote resource window changes in the desktop environment of the remote computing device. In some embodiments, the remote computing device may poll the remote resource window to determine if the window has changed such as to check whether the contents of the remote resource window have changed. If the window has changed, the method may proceed to step 825. If the window has not changed, the method may continue monitoring the window for a change by repeating step 824.

At step 825, the remote computing device may determine whether the remote window preview status is set to on. As will be discussed in more detail below, when a local computing device no longer requires the snapshot from the remote computing device, the remote window preview status may have been reset to off by another process of the remote computing device. If the remote window preview status has been set to off or otherwise not set to on, the method may end. However, if the remote window preview status is on, the method proceeds to step 822 to take a new snapshot of the remote resource window.

FIG. 8C illustrates an example method for displaying window snapshots at a local computing device. At step 830, the local computing device may receive a snapshot of the remote resource window from the remote computing device. In some embodiments, the local computing device may process the received image such as by decompressing the image or converting the compressed snapshot to an uncompressed bitmap. Additionally, the snapshot may be a differential image. In some instances, the local computing device may determine whether the snapshot is a differential image via a setting of a flag, attribute, or other indicator of the snapshot or message containing the snapshot. If the snapshot is a differential image, the local computing device may compare the differential image to a last known snapshot that is stored by the local computing device (e.g., the custom icon). In some variations, an XOR operation may be performed between the differential image and the last known snapshot to produce a full non-differential image, which may be used as the snapshot for a window preview.

At step 831, the local computing device may store the snapshot of the remote resource window as a custom icon for use as a window preview. In some embodiments, the full non-differential image may be stored as the custom icon. Alternatively, the received snapshot (e.g., when it is a full image or a non-differential image of the remote resource window) may be stored as the custom icon. In some arrangements, the custom icon is used as the last known snapshot for the remote resource window. In some instances, replacing the custom icon may change a window preview that is being displayed by the local computing device to the received snapshot.

At step 832, the local computing device may store the snapshot of the remote resource window as a window image. The window image may be used as preview images for various interfaces, such as thumbnail previews. In some arrangements, the local computing device may use the snapshot for the display of the remote resource window in the local desktop environment. For example, the local computing device may replace the clipped image of the remote resource window with the received snapshot. In one or more variations, the local desktop environment may analyze the snapshot to determine whether it is of sufficient size and/or resolution to be used as the window image. If the window is of insufficient size and/or resolution, the snapshot may not be stored as the window image. Further, if the window is of insufficient size and/or resolution, steps 833 and 834 may be skipped, in some variations.

Additionally, in some arrangements, the local computing device may disable updates to the remote resource window. For example, the local computing device may disable the otherwise regular graphics virtual channel updates to the remote resource window. The local computing device may disable external and/or internal window clipping for local child windows of the remote resource window (in some instances, the snapshot may include the child windows as if they were part of the remote resource window). For example, various graphic features such as Remote Audio & Video Extensions (RAVE), Flash or Windows Media video, among others, may be rendered at the local computing device as child windows on top of the remote resource window. External clipping may occur when another window overlays the remote resource window. Internal clipping may occur over the child window such as when a user activates a pull-down menu in the parent remote media player that displays over the child window. Such disabling of updates and clipping may allow the received snapshot to remain an accurate representation of the remote resource window while the user is viewing the window preview.

At step 833, the local computing device may disable the custom icon preview for the remote resource window. Additionally or alternatively, the local computing device may enable the desktop manager of the local computing device to generate live previews for the window (which would use the window image set in step 832). In some embodiments, the local computing device may set a window attribute, such as DWMWA_HAS_ICONIC_BITMAP to FALSE using the DwmSetWindowAttribute method.

At step 834, the local computing device may generate the window image as the window preview. In some embodiments, this may be done by the desktop window manager of the operating system such as a compositing window manager may generate a preview using an image stored as the window image.

In some arrangements, the local computing device may receive video, or other types of data, such as graphics acceleration features, in one or more separate streams (e.g., over a stream for RAVE, Flash, OpenGL, etc.). In some variations, the separate streams may be received in parallel with each other and/or the stream that includes the snapshot(s). In some arrangements, the local computing device may merge data from the separate streams with the snapshot. For example, the snapshot may be combined with data received from a Flash, RAVE, or OpenGL stream to create a composition of the multiple streams of data. The composition may be used as the window image for the window preview.

Additionally, as discussed above, the remote computing device may be repeatedly transmitting snapshots to the local computing device (e.g., whenever the window changes, according to a periodic schedule, etc.). Accordingly, the local computing device may repeatedly update the window preview with the received snapshot. In some instances, updating the window preview repeatedly may provide a dynamic window preview or "live" window preview.

At step 835, the local computing device determines whether the remote resource window is not clipped and not overlapped. If both conditions are met, the method may proceed to step 836. If the remote resource window is still clipped or being overlapped by another remote resource window in the local computing device's desktop environment, the method may proceed to step 830 to wait for receipt of another snapshot from the remote computing device. In some variations, this may be performed in parallel with other functions of the local computing device.

Additionally or alternatively, the local computing device may determine whether the window preview is no longer needed. For example, the user may close the window preview, select another window that closes the window preview, or perform some other interaction that causes the window preview to no longer be displayed on the local computing device. In some embodiments, the local computing device may detect that a taskbar or other element closed or terminated a window with a class name indicating the preview such as "TaskListThumbnailWnd", "TaskSwitcherWnd", "Flip3D", or other such name. When the local computing device determines that the window preview is no longer needed, the method may proceed to step 836. Otherwise, the method may proceed to step 830 to wait for receipt of another snapshot from the remote computing device. In some variations, this may be performed in parallel with other functions of the local computing device.

At step 836, the local computing device may transmit a notification to the remote computing device that indicates that remote snapshots are no longer needed. The notification may include information such as a control command, HostID, window handle, a position of the remote resource window, a parent window of the remote resource window, and/or other information that uniquely identifies the remote resource window. The notification may include one or more flags set to not request remote window previews of the remote resource window. Additionally, the local computing device may enable updates to the remote resource window and may enable external and/or internal window clipping. For example, the local computing device may enable the graphics virtual channel updates to the remote resource window.

FIG. 8D illustrates an example method for stopping a process that sends window snapshots from a remote computing device. At step 840, the remote computing device may receive a notification that remote snapshots are no longer needed by the local computing device. At step 841, the remote computing device may set the remote window preview status to off responsive to receiving the notification. In some variations, this may be performed in parallel with other functions of the remote computing device.

Figure 10:
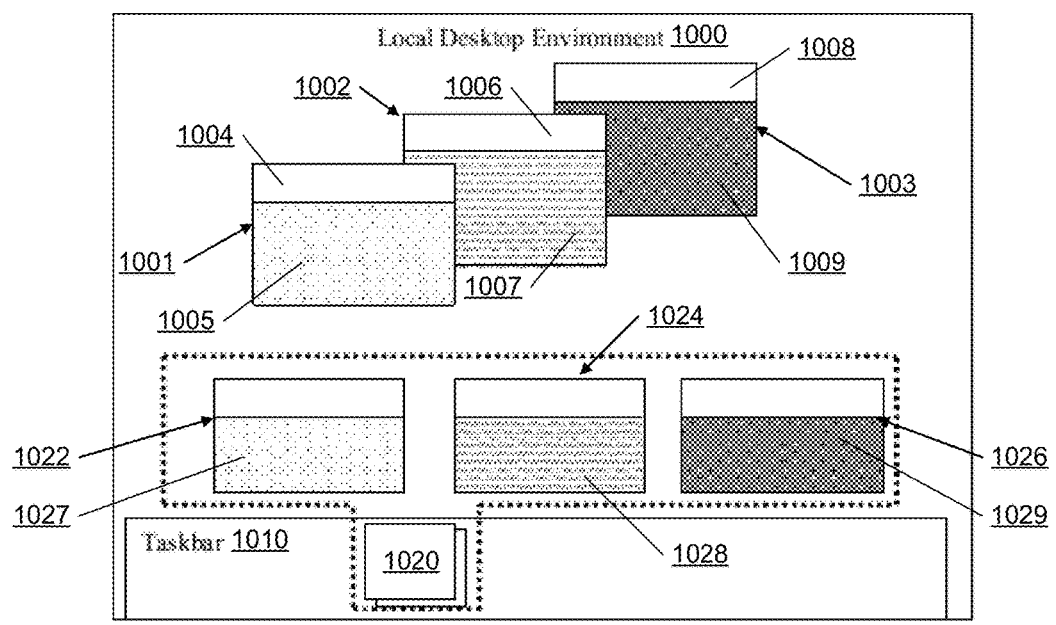
FIG. 10 illustrates an example local desktop environment showing thumbnail previews created with a remote computing device according to various aspects described herein.

FIG. 10 illustrates an example local desktop environment showing thumbnail previews created with a remote computing device. As illustrated, local desktop environment 1000 may include window 1001, remote resource window 1002, remote resource window 1003, and taskbar 1010. Remote resource window 1001 may include content 1005 and title bar 1004. Window 1002 may include content 1007 and title bar 1006. Remote resource window 1008 may include content 1009 and title bar 1008. Taskbar 1010 may include taskbar group 1020 and thumbnail previews for the three windows. Thumbnail preview 1022 for window 1001 may include snapshot 1027, thumbnail preview 1024 for remote resource window 1002 may include snapshot 1028, and thumbnail 1026 for remote resource window 1003 may include snapshot 1029. According to various aspects described herein, snapshot 1029 may be created and sent from a remote computing device, which is hosting the remote resource. Snapshot 1029 does not include any portion of remote resource window 1002 or window 1001. In some arrangements, remote resource window 1002 and 1003 may share the same LVB on the local computing device.

Additionally, numerous other embodiments, modifications and variations within the scope and spirit of the appended claims will occur to persons of ordinary skill in the art from a review of this disclosure.

What is claimed is:

1. A method, comprising:
sending, by a computing platform and to a client computing device, data for a first graphical window in which a first application hosted by the computing platform is being presented by the client computing device;
receiving, by the computing platform and from the client computing device, a request for a window preview of the first graphical window;
determining a time when the first graphical window is overlapped by a second graphical window comprising a second application, wherein the second application is hosted by the computing platform; and
based on detecting, by the computing platform, in response to the request, and during the time, a change in one or more displayable aspects of the first graphical window;
comparing a first snapshot of the first graphical window before the change in the one or more displayable aspects with a second snapshot of the first graphical window after the change in the one or more displayable aspects;
responsive to the request and during the time, generating, by the computing platform and based on the comparing, a differential image of the first graphical window, wherein the differential image encodes indicates the change in the one or more displayable aspects of the first graphical window without the second graphical window overlapping the first graphical window; and
causing, based on the differential image, the client computing device to render the window preview of the first graphical window, wherein the window preview is based on the differential image.

2. The method of claim 1, further comprising:
sending, by the computing platform and to the client computing device, the differential image.

3. The method of claim 1, wherein the causing the client computing device to render the window preview comprises:
causing the client computing device to render a thumbnail preview of the first graphical window that comprises the differential image.

4. The method of claim 3, wherein causing the client computing device to render the thumbnail preview comprises rendering the thumbnail preview adjacent to a portion of a taskbar rendered by the client computing device that is associated with the first application.

5. The method of claim 2, wherein the differential image is compressed or subjected to color depth conversion prior to the sending the differential image to the client computing device.

6. The method of claim 1, wherein the computing platform comprises a virtualization computing platform, the method comprising:
hosting, by the virtualization computing platform, one or more distinct virtual computing environments; and
executing, by the virtualization computing platform, the first application and the second application within the one or more distinct virtual computing environments.

7. The method of claim 1, wherein the client computing device comprises at least one of a mobile phone, a smart phone, and-or a personal digital assistant (PDA).

8. The method of claim 1, wherein the client computing device comprises at least one of a desktop computer and-or a laptop computer.

9. A method, comprising:
generating, by a client computing device, a request for a window preview of a first graphical window, wherein the first graphical window is generated by a first application hosted by a computing platform that is distinct from the client computing device;
sending, by the client computing device and to the computing platform, the request for the window preview;
determining a time when the first graphical window is overlapped by a second graphical window comprising a second application, wherein the second application is hosted by the computing platform;
responsive to the request and during the time:
comparing a first snapshot of the first graphical window before a change in one or more displayable aspects of the first graphical window with a second snapshot of the first graphical window after the change in the one or more displayable aspects;
determining, based on the comparing, a differential bitmap indicating a difference between an appearance of the first graphical window and a black image corresponding to the second graphical window; and
generating, by the client computing device, the window preview of the first graphical window, wherein the window preview is based on the differential bitmap.

10. The method of claim 9, wherein the generating the window preview comprises rendering a thumbnail preview of the first graphical window generated by the first application that comprises the differential bitmap.

11. The method of claim 10, wherein the rendering the thumbnail preview comprises rendering the thumbnail preview adjacent to a portion of a taskbar rendered by the client computing device that is associated with the first application.

12. The method of claim 9, further comprising:
storing the differential bitmap as a custom icon.

13. A computing platform, comprising: a communication interface;
one or more processors; and
memory storing executable instructions that, when executed by the one or more processors, cause the computing platform to:
send, via the communication interface and to a client computing device, data for a first graphical window, wherein the first graphical window is associated with a first application that is executed by the computing platform and is presented by the client computing device;
receive, via the communication interface and from the client computing device, a request for a window preview of the first graphical window;
detect a change in one or more displayable aspects of the first graphical window;
determine a time when the first graphical window is overlapped by a second graphical window comprising a second application, wherein the second application is hosted by the computing platform; and
based on detecting, in response to the request and during the time, a change in one or more displayable aspects of the first graphical window:
compare a first snapshot of the first graphical window before the change in one or more displayable aspects with a second snapshot of the first graphical window after the change in the one or more displayable aspects; and
responsive to the request and at the time, generate, based on the comparing, a differential image of the first graphical window that encodes indicates the change in the one or more displayable aspects of the first graphical window without the second graphical window overlapping the first graphical window; and
cause the client computing device to render the window preview of the first graphical window, wherein the window preview is based on the differential image.

14. The computing platform of claim 13, wherein the executable instructions, when executed by the one or more processors, further cause the computing platform to:
communicate, via the communication interface, the differential image to the client computing device.

15. The computing platform of claim 13, wherein the executable instructions, when executed by the one or more processors, further cause the computing platform to:
host one or more distinct virtual computing environments; and
execute the first application and the second application within the one or more distinct virtual computing environments.

16. The computing platform of claim 14, wherein the differential image is compressed prior to communicating the differential image to the client computing device.

17. The method of claim 9, wherein the client computing device comprises at least one of a mobile phone, a smart phone, or a personal digital assistant (PDA).

18. The method of claim 9, wherein the client computing device comprises at least one of a desktop computer or a laptop computer.

19. The method of claim 1, comprising:
determining that the first graphical window is an active window in comparison to one or more other graphical windows,
wherein the differential image is based on determining that the first graphical window is the active window.

20. The method of claim 9, wherein the differential bitmap is based on determining that the first graphical window is an active window.

* * * * *